(12) United States Patent
Okamatsu et al.

(10) Patent No.: US 9,484,818 B2
(45) Date of Patent: Nov. 1, 2016

(54) DC-DC CONVERTER

(71) Applicant: Panasonic Intellectual Property Management Co., Ltd., Osaka (JP)

(72) Inventors: Masashi Okamatsu, Osaka (JP); Hideki Tanaka, Shiga (JP); Katsuya Hagiwara, Osaka (JP); Masahiro Tochigi, Osaka (JP); Takashi Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/763,279

(22) PCT Filed: Jan. 30, 2014

(86) PCT No.: PCT/JP2014/000470
§ 371 (c)(1),
(2) Date: Jul. 24, 2015

(87) PCT Pub. No.: WO2014/119307
PCT Pub. Date: Aug. 7, 2014

(65) Prior Publication Data
US 2015/0357917 A1    Dec. 10, 2015

(30) Foreign Application Priority Data

Jan. 31, 2013  (JP) ................................. 2013-016525

(51) Int. Cl.
*G05F 1/56* (2006.01)
*H02M 3/158* (2006.01)
(Continued)

(52) U.S. Cl.
CPC ............... *H02M 3/158* (2013.01); *H02M 1/08* (2013.01); *H02M 3/1582* (2013.01); *H02M 2001/0006* (2013.01)

(58) Field of Classification Search
CPC ............................................. H02M 2001/0006
USPC ......................................... 323/271–289, 315
See application file for complete search history.

(56) References Cited

U.S. PATENT DOCUMENTS 5,627,460 A * 5/1997 Bazinet .................. G05F 1/618
                                                          323/224
6,650,100 B1 * 11/2003 Kohout ................... G05F 1/613
                                                          323/282

(Continued)

FOREIGN PATENT DOCUMENTS

JP       2004-048830       2/2004
JP       2005-033862       2/2005

(Continued)

OTHER PUBLICATIONS

International Search Report of PCT application No. PCT/JP2014/000470 dated Apr. 15, 2014.

*Primary Examiner* — Adolf Berhane
*Assistant Examiner* — Nusrat Quddus
(74) *Attorney, Agent, or Firm* — McDermott Will & Emery LLP

(57) ABSTRACT

A DC-DC converter includes first and second switching devices electrically connected in series between an input terminal and a ground terminal, third and fourth switching devices electrically connected in series between an output terminal and the ground terminal, an inductor, a drive circuit that drives the first switching device to turn on and off, a bootstrap capacitor circuit connected electrically to the drive circuit, and a control circuit. The control circuit is operable to turn on and off the switching devices serially connected with each other after a simultaneous-off duration for which both of the switching devices are continuously turned off. The control circuit is operable to charge the bootstrap capacitor by continuously turning on keeping the second switching device for a charging duration while continuously turning off the first switching device for a sustaining duration determined by the simultaneous-off duration and the charging duration. This DC-DC converter can reduce a current ripple even when the bootstrap capacitor is charged.

16 Claims, 8 Drawing Sheets

(51) Int. Cl.
   *H02M 1/08*  (2006.01)
   *H02M 1/00*  (2006.01)

(56) References Cited

U.S. PATENT DOCUMENTS

| | | | | |
|---|---|---|---|---|
| 8,502,511 | B1* | 8/2013 | Kung | H02M 3/1588 |
| | | | | 323/225 |
| 8,536,847 | B2* | 9/2013 | Liang | H03K 17/687 |
| | | | | 323/282 |
| 2004/0085048 | A1 | 5/2004 | Tateishi | |
| 2005/0007089 | A1 | 1/2005 | Niiyama et al. | |
| 2007/0182390 | A1* | 8/2007 | Ishii | H03K 17/163 |
| | | | | 323/282 |
| 2009/0039843 | A1* | 2/2009 | Kudo | H02M 3/1584 |
| | | | | 323/272 |
| 2009/0206810 | A1* | 8/2009 | Chellamuthu | H02M 3/156 |
| | | | | 323/282 |
| 2015/0061611 | A1* | 3/2015 | Li | H02M 3/1588 |
| | | | | 323/235 |
| 2015/0303806 | A1* | 10/2015 | Madsen | H02M 3/158 |
| | | | | 323/271 |
| 2015/0311797 | A1* | 10/2015 | Okamatsu | H02M 3/1582 |
| | | | | 323/271 |
| 2016/0043624 | A1* | 2/2016 | Jarvinen | H02M 1/084 |
| | | | | 323/271 |

FOREIGN PATENT DOCUMENTS

| | | |
|---|---|---|
| JP | 2010-259190 | 11/2010 |
| JP | 2012-029361 | 2/2012 |

* cited by examiner

DC-DC CONVERTER

This application is a U.S. national stage application of the PCT international application No. PCT/JP2014/000470 filed on Jan. 30, 2014, which claims the benefit of foreign priority of Japanese patent application No. 2013-016525 filed on Jan. 31, 2013, the contents all of which are incorporated herein by reference.

TECHNICAL FIELD

The present invention relates to a DC-DC converter capable of performing voltage conversion of both stepping up and stepping down the voltage.

BACKGROUND ART

Conventional power supply circuits including a type equipped with a buck-boost DC-DC converter used for stepping-up conversion and stepping-down conversion of direct-current (DC) voltages.

FIG. 7 is a circuit diagram of conventional power supply circuit 500 disclosed in PTL 1. Power supply circuit 500 includes input terminal 103 connected to commercial power supply 101. Diode bridge 105 is connected to input terminal 103. Input capacitor 107 is connected in parallel with diode bridge 105 in a subsequent stage. In addition, a buck-boost DC-DC converter is connected in a subsequent stage of diode bridge 105.

The buck-boost DC-DC converter includes inductor 109, high-side switching device 111, low-side switching device 113, diode 115, diode 117, and output capacitor 119. Both ends of output capacitor 119 function as output terminals 121 of power supply circuit 500. Load 123 is connected to output terminal 121.

Power supply circuit 500 further includes controller 125, current detector 127, high-side driver IC 129, and a bootstrap circuit. The bootstrap circuit includes bootstrap capacitor 131 and diode 133.

DC drive voltage Vcc is supplied to controller 125. Controller 125 generates a switching control signal that turns on and off high-side switching device 111 and low-side switching device 113 to match an output current value with a target current value.

In the bootstrap circuit, bootstrap capacitor 131 is charged with the DC drive voltage Vcc when both high-side switching device 111 and low-side switching device 113 are turned off. This electric charge is used to raise a ground level of the switching control signal of high-side switching device 111, and secure a drive voltage necessary for turning on high-side switching device 111.

In this buck-boost DC-DC converter of power supply circuit 500, the drive voltage necessary to turn on high-side switching device 111 can be secured by raising the ground level with the electric charge of bootstrap capacitor 131. A characteristic of electric current IL in inductor 109 changes with lapse of time when bootstrap capacitor 131 is charged since the electric current IL increases by an amount for charging. FIG. 8 shows this condition.

FIG. 8 illustrates waveforms of voltages and electric currents in voltage step-up operation of power supply circuit 500. FIG. 8 shows voltage VQ1 supplied to a gate of high-side switching device 111, voltage VQ2 supplied to a gate of low-side switching device 113, current IQ1 that flows between a drain and a source of high-side switching device 111, current IQ2 that flows between a drain and a source of low-side switching device 113, and current IL that flows through inductor 109. In FIG. 8, the vertical axis represents voltage or current, and the horizontal axis represents time.

High-side switching device 111 is turned on when voltage VQ1 is at value Vhi1, and is turned off when voltage VQ1 is at level Vlow1. Low-side switching device 113 is turned on when voltage VQ2 is at value Vhi2, and is turned off when voltage VQ2 is at level Vlow2.

During a boost operation, fundamentally, controller 125 switches the level of voltage VQ2 between levels Vhi2 and Vlow2 alternately at a predetermined period to turning on and off low-side switching device 113 periodically at the predetermined period while maintains voltage VQ1 at voltage level Vhi1 to continuously turn on high-side switching device 111. However, in order to charge bootstrap capacitor 131, controller 125 switches voltage VQ1 to level Vlow1 to turn off high-side switching device 111 only for a duration Tfoff1 in a duration Tfoff2 for which low-side switching device 113 is turned off, and maintains the voltage VQ1 at level Vhi1 for a duration outside of duration Tfoff1 to continuously turn on high-side switching device 111. This operation causes an electric current to flow from inductor 109 to bootstrap capacitor 131 and charge bootstrap capacitor 131. As a result, electric current IQ1 flows between the drain and the source of high-side switching device 111, and electric current IQ2 flows between the drain and the source of low-side switching device 113, as shown in FIG. 8. Accordingly, electric current IL flows to inductor 109 as shown in FIG. 8.

As illustrated in FIG. 8, a declining slope of electric current IL in the duration Tfoff1 for which voltage VQ1 of high-side switching device 111 is reduced to level Vlow1 becomes larger than slopes of electric current IL before and after the duration Tfoff1. This is because electric current IL that flows through inductor 109 increases by an amount of the current used to charge bootstrap capacitor 131. Therefore, even though the waveform of electric current IL does not become a precise triangular wave, a peak value of electric current IL is constant since bootstrap capacitor 131 is charged every duration Tfoff2 for which low-side switching device 113 is turned off, hence stabilizing the boost operation of the DC-DC converter.

However, in the case that bootstrap capacitor 131 is charged less frequently, that is, when bootstrap capacitor 131 is charged once per plural on-off periods of low-side switching device 113, a ripple current may appears in an output current of power supply circuit 500.

CITATION LIST

Patent Literature

PTL 1: Japanese Patent Laid-Open Publication, No. 2012-29361

SUMMARY

A DC-DC converter includes first and second switching devices electrically connected in series between an input terminal and a ground terminal, third and fourth switching devices electrically connected in series between an output terminal and the ground terminal, an inductor, a drive circuit that turns on and off the first switching device, a bootstrap capacitor circuit connected electrically to the drive circuit, and a control circuit. The control circuit is operable to turn on and off the switching devices connected in series to each other after a simultaneous-off duration for which both these switching devices are turned off. The control circuit is operable to charge the bootstrap capacitor by continuously turning on the second switching device for a charging duration while continuously turning off the first switching device for a sustaining duration determined by the simultaneous-off duration and the charging duration.

This DC-DC converter can reduce a ripple current even when the bootstrap capacitor is charged.

DETAIL DESCRIPTION OF PREFERRED EMBODIMENTS

Exemplary Embodiment 1

Figure 1:
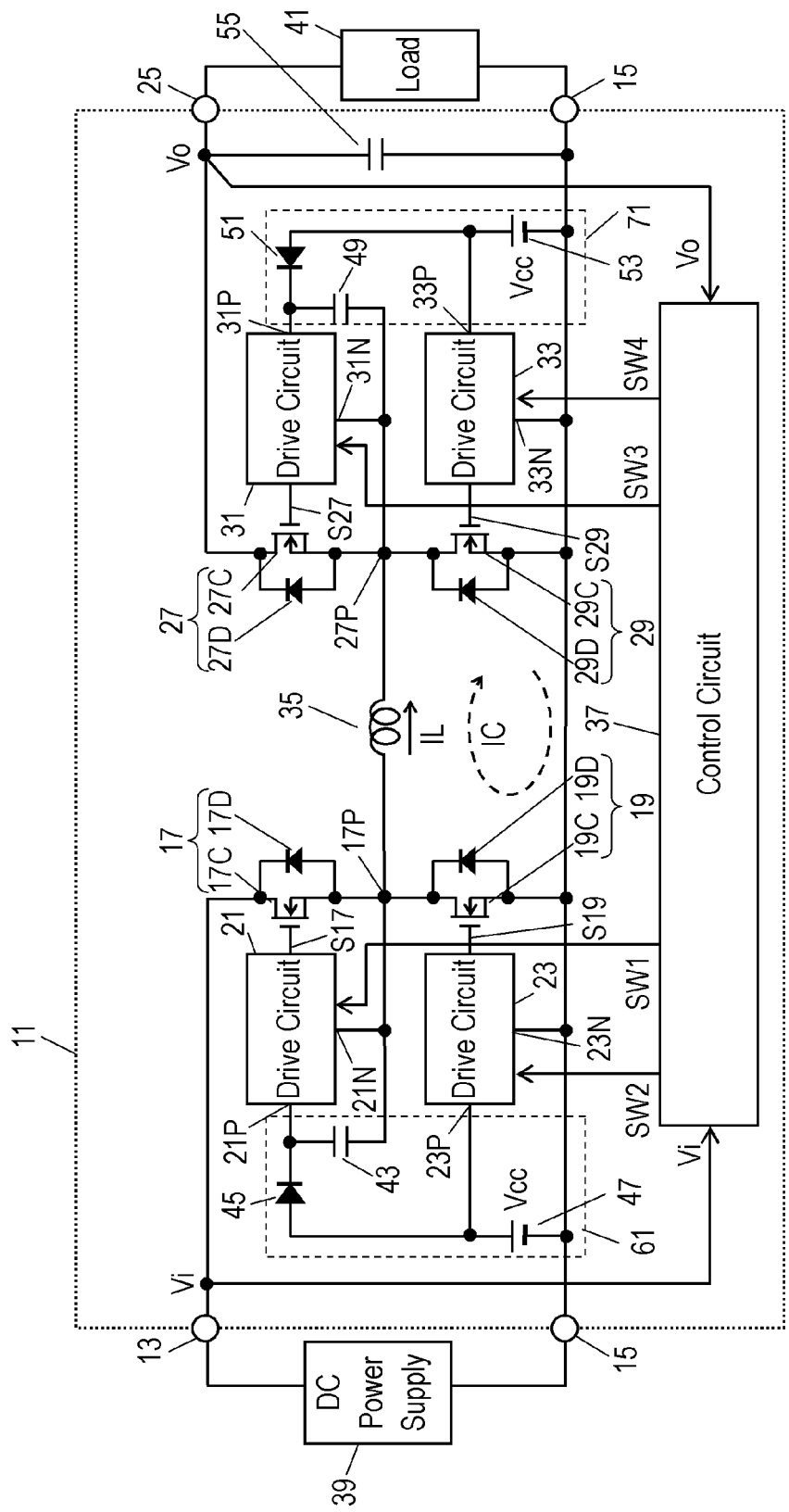
FIG. 1 is a circuit block diagram of a DC-DC converter according to Exemplary Embodiment 1 of the present invention.

FIG. 1 is a circuit block diagram of DC-DC converter 11 according to Exemplary Embodiment 1 of the present invention. DC-DC converter 11 is configured to output voltage Vo obtained by converting input voltage Vi, and includes input terminal 13 for receiving input voltage Vi applied thereto, output terminal 25 for delivering output voltage Vo, and ground terminal 15. DC-DC converter 11 further includes switching device 17 electrically connected in series between input terminal 13 and ground terminal 15, switching device 19 electrically connected in series with switching device 17 at node 17P and between input terminal 13 and ground terminal 15, drive circuit 21 for turning on and off driving switching device 17, bootstrap capacitor circuit 61 electrically connected to drive circuit 21, and drive circuit 23 for turning on and off switching device 19. DC-DC converter 11 further includes switching device 27 electrically connected in series between output terminal 25 and ground terminal 15, switching device 29 electrically connected in series with switching device 27 at node 27P and between output terminal 25 and ground terminal 15, drive circuit 31 for turning on and off driving switching device 27, bootstrap capacitor circuit 71 electrically connected to drive circuit 31, and drive circuit 33 for turning on and off driving switching device 29. Bootstrap capacitor circuits 61 and 71 include bootstrap capacitors 43 and 49 respectively. DC-DC converter 11 further includes inductor 35 electrically connected in series between nodes 17P and 27P, and control circuit 37 electrically connected with drive circuits 21, 23, 31 and 33.

Control circuit 37 is operable to alternately turn on and off switching devices 27 and 29 while interposing simultaneous-off durations Dt3 and Dt4 between the turning on and off of the switching devices in that case that input voltage Vi is stepped up and the stepped-up voltage is output from output terminal 25. Bootstrap capacitor 43 is charged for charging duration Pc1. In the case that control circuit 37 steps up input voltage Vi and outputs the stepped-up voltage from output terminal 25, in order to charge bootstrap capacitor 43, control circuit 37 is operable to continuously turn off switching device 27 and turning on switching device 29 for sustaining duration Kt which is a total of charging duration Pc1 and simultaneous-off durations Dt1 and Dt2.

Control circuit 37 is also operable to alternately turn on and off switching devices 17 and 19 while interposing simultaneous-off durations Dt1 and Dt2 between the turning on and off of the switching devices in the case that input voltage Vi is stepped down and the stepped-down voltage is output from output terminal 25. Bootstrap capacitor 49 is charged in charging duration Pc2. In the case that input voltage Vi is stepped down and the stepped-down voltage is output from output terminal 25, in order to charge bootstrap capacitor 49, control circuit 37 is operable to continuously turn off switching device 17 and turning on switching device 19 for charging duration Pc2.

When bootstrap capacitor 43 is charged in the boost operation, control circuit 37 continuously turns off switching device 27 and turning on switching device 29 for sustaining duration Kt. As a result, an inductor current IL that flows through inductor 35 can be constant for sustaining duration Kt. In addition, switching device 17 is continuously turned off and switching device 19 is continuously turned on for charging duration Pc2 when bootstrap capacitor 49 is charged in the buck operation. As a result, the inductor current IL that flows through inductor 35 can also be constant for charging duration Pc2. These operations allow the inductor current IL to be constant while bootstrap capacitors 43 and 49 are charged in either of the boost operation and the buck operation. The inductor current IL therefore becomes stable without incurring a shift in the peak value of the inductor current IL even when the turning on and off of the switching devices is restarted to start the boost operation or buck operation after the charge. Accordingly, an electric current that flows to output terminal 25 becomes steady, and a ripple current attributable to the charging of bootstrap capacitors 43 and 49 can be reduced.

Figure 7:
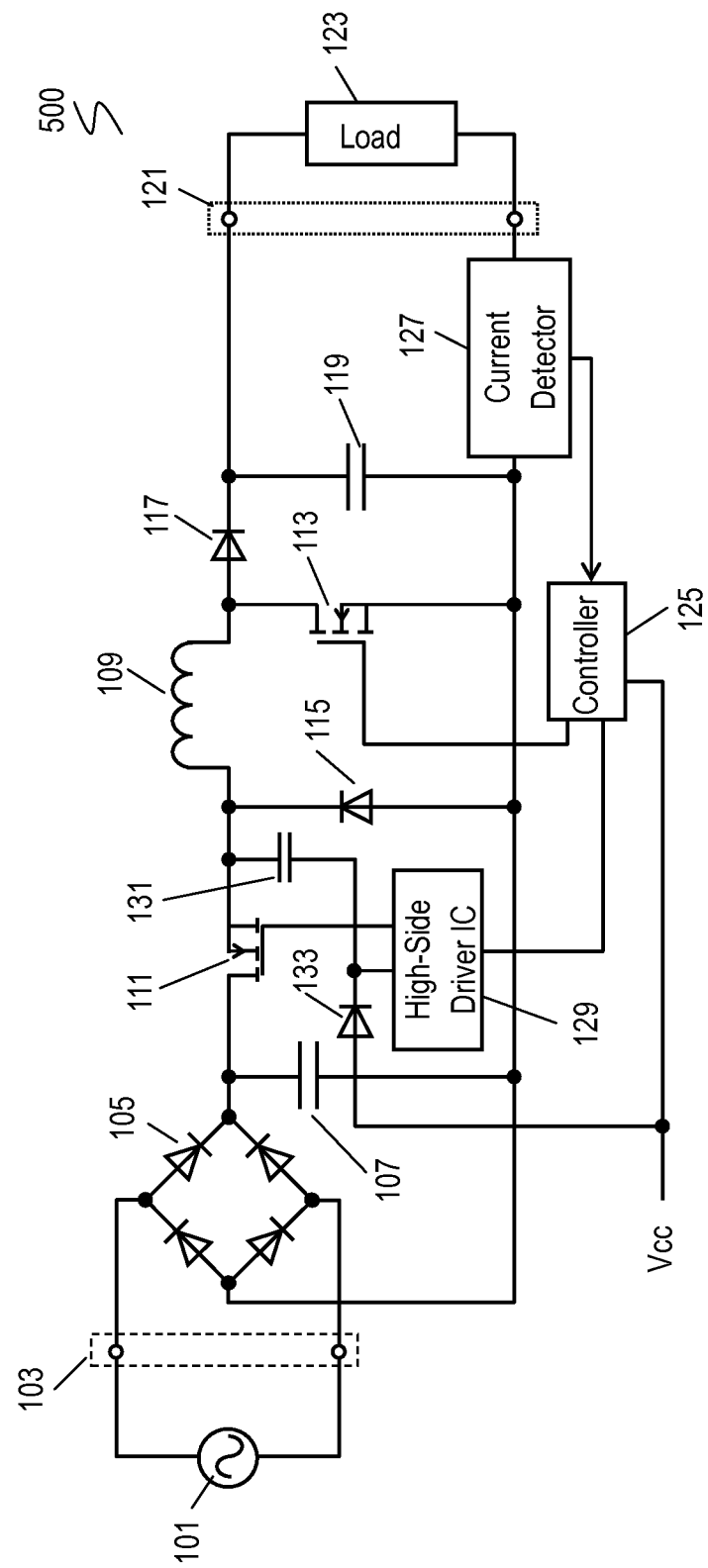
FIG. 7 is a circuit diagram of a conventional power supply circuit.
Figure 8:
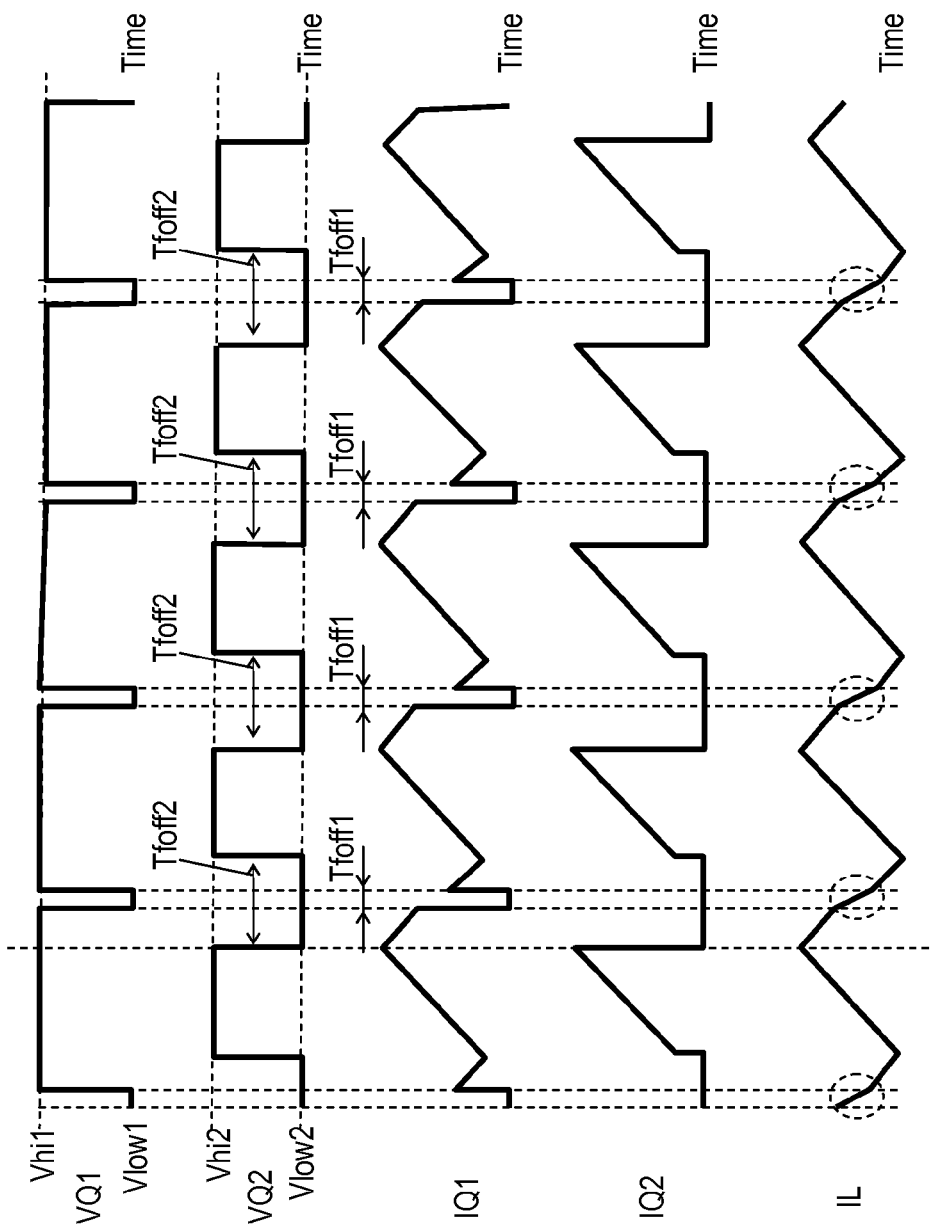
FIG. 8 shows voltages and currents in a boost operation of the conventional power supply circuit.

In conventional power supply circuit 500 shown in FIGS. 7 and 8, a peak value of electric current IL increases and then decreases until the electric current IL becomes steady through the use of feedback control based on the electric current detected by current detector 127 after a gradient of the electric current IL changes, when bootstrap capacitor 131 is charged less frequently, that is, when bootstrap capacitor 131 is charged once of plural on-off periods of low-side switching device 113. Such a change in the electric current IL appears as a ripple current in the output current of power supply circuit 500. The ripple current is produced similarly when an amount of electric charge remaining in bootstrap capacitor 131 changes.

A structure and operation of DC-DC converter 11 according to Embodiment 1 will be described below. According to Embodiment 1, direct-current (DC) power supply 39 is implemented by a solar battery for producing a voltage that changes depending on, e.g. seasons, weather conditions, and shadow. DC-DC converter 11 is operable to convert input voltage Vi that changes as above by increasing or decreasing, and to output constant output voltage Vo.

As shown in FIG. 1, DC power supply 39 is electrically connected between input terminal 13 and ground terminal 15 of DC-DC converter 11, and an electric power generated by DC power supply 39 of the solar battery is input to DC-DC converter 11 through input terminal 13 and ground terminal 15.

Load 41 is electrically connected with between output terminal 25 and ground terminal 15 of DC-DC converter 11. Load 41 may be an electric apparatus activated by a constant voltage output from DC-DC converter 11, or a conditioner for converting the output voltage to a commercial power (e.g., AC 100V power) with an inverter.

A structure of DC-DC converter 11 will be detailed below.

Switching devices 17 and 19 are electrically connected in series at node 17P and between input terminal 13 and ground terminal 15 of DC-DC converter 11. Switching devices 27 and 29 are electrically connected in series at node 27P and between output terminal 25 and ground terminal 15. Switching devices 17, 19, 27 and 29 are semi-conductor switching devices that are composed of field-effect transistors (FETs) according to Embodiment 1. Switching device 17 includes switch 17C connected in series between input terminal 13 and node 17P, and parasitic diode 17D connected in parallel with switch 17C. An anode and a cathode of parasitic diode 17D are connected to node 17P and input terminal 13, respectively. Switching device 19 includes switch 19C connected in series between node 17P and ground terminal 15, and parasitic diode 19D connected in parallel with switch 19C. An anode and a cathode of parasitic diode 19D are connected to ground terminal 15 and node 17P, respectively. Switching device 27 includes switch 27C connected in series between output terminal 25 and node 27P, and parasitic diode 27D connected in parallel with switch 27C. An anode and a cathode of parasitic diode 27D are connected to node 27P and output terminal 25, respectively. Switching device 29 includes switch 29C connected in series between node 27P and ground terminal 15, and parasitic diode 29D connected in parallel with switch 29C. An anode and a cathode of parasitic diode 29D are connected to ground terminal 15 and node 27P, respectively. Switches 17C, 19C, 27C and 29C of switching devices 17, 19, 27 and 29 are turned on and off individually by switching signals S17, S19, S27 and S29 of drive circuits 21, 23, 31 and 33, respectively. Switching devices 17, 19, 27 and 29 may not necessarily be limited to FETs, but may be any other type of semi-conductor switching devices performing switching operation in response to switching signals from outside.

Drive circuit 21 configured to turn on and off switching device 17 is electrically connected to a gate of switching device 17. Drive circuit 21 turns on and off switching device 17 in response to switching signal SW1 output from control circuit 37. To be specific, drive circuit 21 outputs switching signal S17 to switching device 17 based on switching signal SW1, and turns on and off switch 17C of switching device 17 in response to switching signal S17.

A ground level of the voltage applied to the gate of switching device 17 is raised in order to turn on switching device 17. In DC-DC converter 11 according to Embodiment 1, bootstrap capacitor circuit 61 connected electrically to drive circuit 21 operates to raise the ground level.

Bootstrap capacitor circuit 61 includes bootstrap capacitor 43, diode 45, and driving power supply 47. A positive terminal of driving power supply 47 is connected electrically to positive power terminal 21P of drive circuit 21 through diode 45 for energizing drive circuit 21. Negative power terminal 21N of drive circuit 21 is connected electrically to node 17P. The ground level of drive circuit 21 is therefore equal to a potential at node 17P. Bootstrap capacitor 43 is connected electrically in series between positive power terminal 21P and negative power terminal 21N of drive circuit 21. Therefore, the highest ground level is input voltage Vi when switching device 17 is turned on. An electric power stored in bootstrap capacitor 43 is supplied to drive circuit 21 to continuously turn on switching device 17.

Drive circuit 23 configured to turn on and off switching device 19 is connected electrically to a gate of switching device 19. Drive circuit 23 turns on and off switching device 19 in response to switching signal SW2 output from control circuit 37. Since negative power terminal 23N of drive circuit 23 is connected electrically to ground terminal 15, drive circuit 23 can be driven any time with drive voltage Vcc of driving power supply 47. A bootstrap capacitor circuit is not necessary for drive circuit 23.

Drive circuit 31 is connected electrically to switching device 27 for turning on and off switching device 27. Drive circuit 31 turns on and off switching device 27 in response to switching signal SW3 output from control circuit 37. To be specific, drive circuit 31 outputs switching signal S27 to switching device 27 based on switching signal SW3, and turns on and off switch 27C of switching device 27 in response to switching signal S27.

Since a ground level of drive circuit 31 is equal to a potential at node 27P, the ground level of the voltage applied to a gate of switching device 27 is raised. Bootstrap capacitor circuit 71 connected electrically to drive circuit 31 operates to raise the ground level.

Bootstrap capacitor circuit 71 includes bootstrap capacitor 49, diode 51, and driving power supply 53. A positive power terminal of driving power supply 53 is connected electrically to positive power terminal 31P of drive circuit 31 through diode 51 for energizing drive circuit 31. Negative power terminal 31N of drive circuit 31 is connected electrically to node 27P. The ground level of drive circuit 31 therefore becomes equal to a potential at node 27P. Bootstrap capacitor 49 is connected electrically in series with between positive power terminal 31P and negative power terminal 31N of drive circuit 31. Therefore, the highest ground level becomes input voltage Vo when switching device 27 is turned on, and an electric power of bootstrap capacitor 49 is supplied to drive circuit 31 to continuously turn on switching device 27.

DC-DC converter 11 according to Embodiment 1 includes separate driving power supplies 47 and 53. In this structure, even if one of the driving power supplies fails to function and a switching device controlled by one of the drive circuits connected to the failed driving power supply becomes unable to perform the switching operation, another switching device controlled by the other drive circuit connected to another one of the driving power supplies that functions normally can continuously perform the switching operation. In other words, control circuit 37 can turn off either switching device 17 or switching device 27, which is a high-side switching device, by using the drive circuit connected to the normal driving power supply, when the other driving power supply fails to function normally, to interrupt an output from DC-DC converter 11, and this structure can hence enhance the reliability.

In DC-DC converter 11, driving power supplies 47 and 53 may be replaced with a single driving power supply for shared use. In this case, DC-DC converter 11 is suitable for an application in which environmental variations are gentle (for example, a DC-DC converter for indoor installation), and for which not-so-high reliability is required, since the circuit configuration becomes simplified. Accordingly, the driving power supply of either one of the structures can be determined in consideration of the required reliability and complexity of the circuit configuration.

Drive circuit 33 is connected electrically to a gate of switching device 29 for turning switching device 29 on and off. Drive circuit 33 turns on and off switching device 29 in response to switching signal SW4 output from control circuit 37. Since negative power terminal 33N of drive circuit 33 is electrically connected with ground terminal 15, drive circuit 33 can be driven with drive voltage Vcc of driving power supply 53 any time. Therefore, a bootstrap capacitor circuit is not necessary for drive circuit 33.

Control circuit 37 connected electrically to drive circuits 21, 23, 31 and 33 is implemented by a microcomputer and a peripheral circuit, outputs switching signals SW1, SW2, SW3 and SW4 to drive circuits 21, 23, 31 and 33, and turns on and off switches 17C, 19C, 27C and 29C of switching devices 17, 19, 27, and 29. Control circuit 37 is connected electrically with input terminal 13 and output terminal 25, and configured to detect input voltage Vi and output voltage Vo.

Smoothing capacitor 55 is connected electrically between output terminal 25 and ground terminal 15.

An operation of DC-DC converter 11 will be described below.

Figure 2:
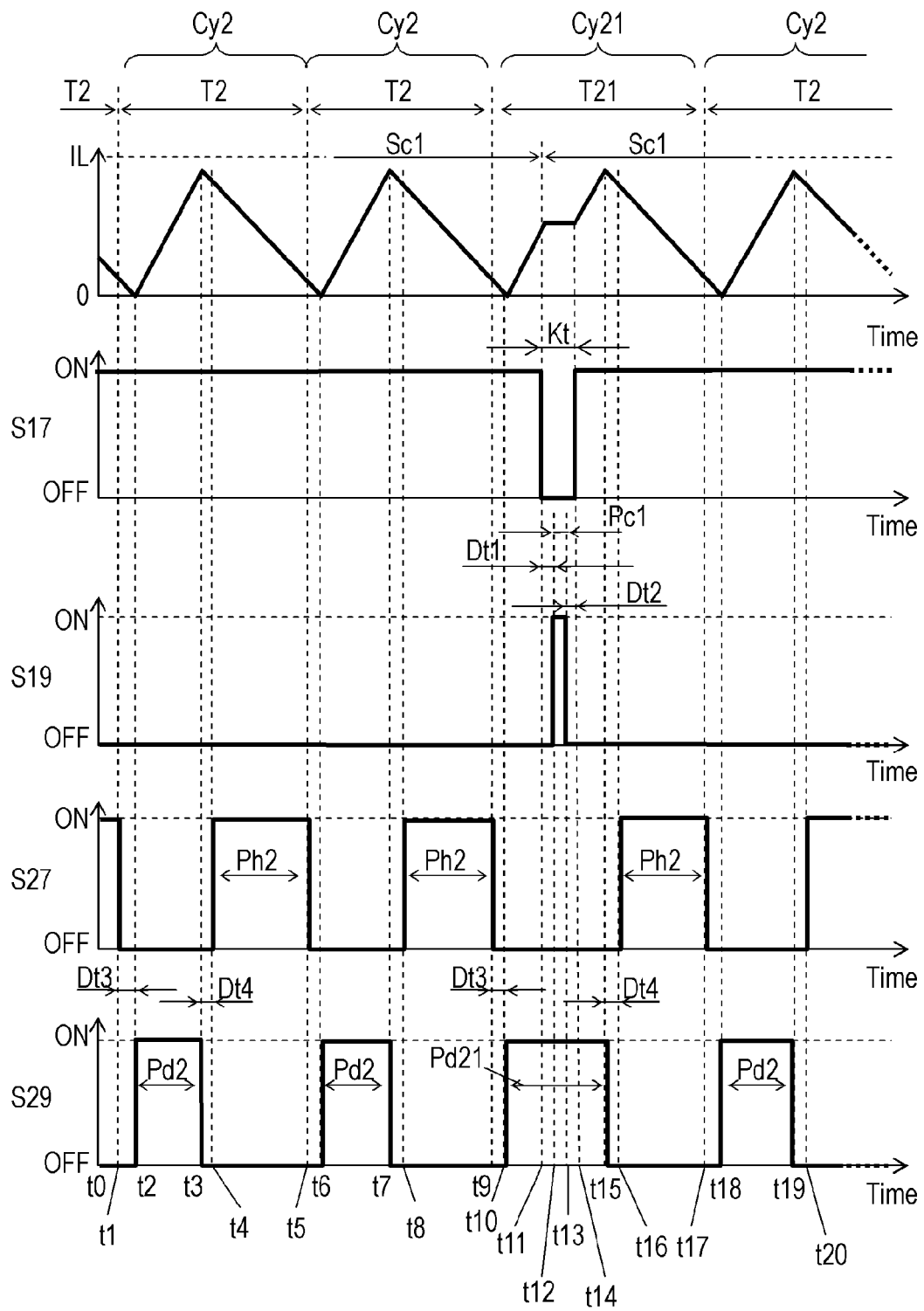
FIG. 2 shows voltages and currents in a boost operation of the DC-DC converter according to Embodiment 1.

A boost operation of DC-DC converter 11 will be first described below. In this operation, input voltage Vi output from DC power supply 39 is low, so that voltage Vi may be stepped up to predetermined output voltage Vo by DC-DC converter 11. FIG. 2 shows electric current IL that flows through inductor 35 of DC-DC converter 11, and switching signals S17, S19, S27 and S29 input to the gates of switching devices 17, 19, 27, and 29 in the boost operation. In FIG. 2, the horizontal axis represents time, and the vertical axis represents electric current and levels of switching signals. The levels of each of switching signals S17, S19, S27 and S29 consist of a level "ON" that turns on switches 17C, 19C, 27C and 29C of switching devices 17, 19, 27 and 29, and a level "OFF" that turn off switches 17C, 19C, 27C and 29C. In the following description, the turning on and off of switching devices 17, 19, 27 and 29 mean the turning on and off of switches 17C, 19C, 27C and 29C, respectively.

In the case that input voltage Vi is stepped up to the predetermined output voltage Vo and output the output voltage Vo through output terminal 25, control circuit 37 fundamentally alternately turns on and off switching devices 27 and 29 periodically at on-off frequency f2 while continuously turning on switching device 17 and continuously turning off switching device 19. That is, control circuit 37 alternately turns on and off switching devices 27 and 29 at a duty ratio determined by control circuit 37 within the on-off period T2 which is the inverse of on-off frequency f2, while continuously turning on switching device 17 and continuously turning off switching device 19. In this operation, control circuit 37 alternately turns on and off switching devices 27 and 29 while interposing simultaneous-off durations Dt3 and Dt4 for which both switching devices 27 and 29 are turned off. Although the on-off frequency f2 is 100 kHz according to Embodiment 1, the on-off frequency f2 may be a different value as appropriate when the required power specification is fulfilled.

A state in which switching device 17 is turned on and switching device 19 is turned off is changed to a state in which switching device 17 is turned off and switching device 19 is turned on subsequently after simultaneous-off duration Dt1 for which both switching devices 17 and 19 are turned off. Then, the state in which switching device 17 is turned off and switching device 19 is turned on is switched to the next state in which switching device 17 is turned on and switching device 19 is turned off subsequently after simultaneous-off duration Dt2 for which both switching devices 17 and 19 are turned off. A state in which switching device 27 is turned on and switching device 29 is turned off is changed to a state in which switching device 27 is turned off and switching device 29 is turned on subsequently after simultaneous-off duration Dt3 for which both switching devices 27 and 29 are turned off. Then, the state in which switching device 27 is turned off and switching device 29 is turned on is changed to the next state in which switching device 27 is turned on and switching device 29 is turned off subsequently after simultaneous-off duration Dt4 for which both switching devices 17 and 19 are turned off. The simultaneous-off durations Dt1 and Dt2 prevent either one or both of switching devices 17 and 19 from not being turned off transitionally while switching devices 17 and 19 are alternately turned on and off, thereby avoiding a large current from flowing through switching devices 17 and 19. Similarly, simultaneous-off durations Dt3 and Dt4 prevent either one or both of switching devices 27 and 29 from not being turned off transitionally while switching devices 27 and 29 are alternately turned on and off, thereby avoiding a large current from flowing through switching devices 27 and 29.

At time point t0, switching device 27 is turned on, and switching device 29 is turned off. After that, when the on-off period T2 quits at time point t1, the on and off states of switching devices 27 and 29 reverse after a lapse of the simultaneous-off duration Dt3 for which both switching devices 27 and 29 are turned off. Specifically, control circuit 37 turns off switching device 27 first at time point t1, as shown in FIG. 2. Switching device 29 is turned off at time point t1. Control circuit 37 then turns on switching device 29 at time point t2 when the simultaneous-off duration Dt3 lapses after time point t1.

The inductor current IL that flows in inductor 35 flows to output terminal 25 through switching device 27 since switching device 27 is turned on and switching device 29 is turned off for a duration from time point t0 to time point t1. The inductor current IL therefore decreases with lapse to time from time point t0 to time point t1. The inductor current IL from inductor 35 flows continuously to output terminal 25 through parasitic diode 27D of switching device 27 though both of switching devices 27 and 29 (i.e., switches 27C and 29C) are turned off from time point t1 to time point t2. Accordingly, inductor current IL decreases with lapse of time from time point t1 to time point t2.

Then, at time point t2, the inductor current IL becomes 0 (zero), the simultaneous-off duration Dt3 quits, and control circuit 37 turns on switching device 29. Since switching device 17 is turned on, the inductor current IL starts to flow from input terminal 13 to inductor 35 at time point t2, and increases with lapse of time.

Subsequently, control circuit 37 turns off switching device 29 at time point t3. This operation cuts off and isolates inductor 35 from ground terminal 15 since switching device 19 is also turned off at time point t3. Therefore, the inductor current IL does not increase after time point t3, and the inductor current IL becomes a maximum value at time point t3.

A duration from time point t3 to time point t4 is a simultaneous-off duration Dt4 for which both switching devices 27 and 29 are turned off. In the simultaneous-off duration Dt4, an electric power stored in inductor 35 is supplied from output terminal 25 to load 41 through parasitic diode 27D of switching device 27. As a result, the inductor current IL starts decreasing with lapse of time at time point t3.

Control circuit 37 turns on switching device 27 at time point t4 when the simultaneous-off duration Dt4 lapses from time point t3. The inductor current IL continuously decreases with lapse of time after time point t4 similarly to the simultaneous-off duration Dt4.

When the on-off period T2 elapses from time point t1, control circuit 37 turns off switching device 27 at time point t5. Switching device 29 is turned off at time point t5. Control circuit 37 turns on switching device 29 at time point t6 when the simultaneous-off duration Dt3 lapses after time point t5. An Operation in further on-off period T2 from time point t5 to time point t8 is identical to the operation up to the on-off period T2 from time point t1 to time point t4. DC-DC converter 11 steps up input voltage Vi from DC power supply 39 to generate output voltage Vo by repeating this operation, and outputs the output voltage Vo to load 41 from output terminal 25.

An operation for charging bootstrap capacitor 43 will be described below.

Drive circuit 21 is activated by the electric power stored in bootstrap capacitor 43, as described above. On the other hand, switching device 17 is controlled by control circuit 37 so that switching device 17 is turned on during the boost operation. Accordingly, drive circuit 21 outputs a gate voltage to continuously turn on switching device 17. As a result, the electric power stored in bootstrap capacitor 43 to activate drive circuit 21 decreases with lapse of time. Control circuit 37 charges bootstrap capacitor 43 at constant intervals.

To be specific, control circuit 37 continuously turns on switching device 17 and turning off switching device 19 from time point t0 to time point t11 as shown in FIG. 2. Control circuit 37 controls switching devices 17 and 19 to charge bootstrap capacitor 43 upon a lapse of charging period Sc1 that is predetermined based on capacitance C1 of bootstrap capacitor 43 and power consumption of drive circuit 21. According to Embodiment 1, the charging period Sc1 is one millisecond. In other words, control circuit 37 turns off switching device 17 at time point t11 when the charging period Sc1 lapses, as shown in FIG. 2. As a result, only switching device 29 out of switching devices 17, 19, 27 and 29 is turned on whereas other switching devices 17, 19 and 27 are turned off at time point t11, as shown in FIG. 2. This operation allows the inductor current IL to flow through switching device 29 to the ground, and return to inductor 35 through parasitic diode 19D of switching device 19 to constitute a circulating current IC. The inductor current IL therefore becomes constant after time point t11, as shown in FIG. 2. A duration from time point t11 to time point t12 is a simultaneous-off duration Dt1 for which both switching devices 27 and 29 are turned off.

After that, control circuit 37 continuously turns on switching device 19 on only for a charging duration Pc1 at time point t12 when the simultaneous-off duration Dt1 lapses after time point a1, as shown in FIG. 2. As a result, an electric current flows from driving power supply 47 to bootstrap capacitor 43 through diode 45, and charges bootstrap capacitor 43 since one end of bootstrap capacitor 43 is connected to the ground. The charging duration Pc1 is stored in control circuit 37 as a known value. The inductor current IL becomes constant after time point t12 since circulating current IC continuously flows for the charging duration Pc1.

After that, control circuit 37 turns off switching device 19 at time point t13 when the charging duration Pc1 lapses from time point t12, as shown in FIG. 2. This stops the electric current flowing from driving power supply 47 to bootstrap capacitor 43 through diode 45, and quits charging bootstrap capacitor 43. This state is identical to the state for the duration from time point t11 to time point t12. Thus, the circulating current IC continuously flows after time point t13 to cause the inductor current IL to be constant. A duration from time point t13 to time point t14 is a simultaneous-off duration Dt2 for which both switching devices 17 and 19 are turned off.

After that, when the simultaneous-off duration Dt2 lapses from time point t13, control circuit 37 turns on switching device 17 at time point t14, as shown in FIG. 2. This state is same as the state before time point a1. The inductor current IL therefore increases again after time point t14, as shown in FIG. 2. The inductor current IL is constant for sustaining duration Kt from time point t11 to time point t14. The sustaining duration Kt is a total of the charging duration Pc1 for charging bootstrap capacitor 43 and the simultaneous-off durations Dt1 and Dt2.

After that, control circuit 37 turns off switching device 29 at time point t15, as shown in FIG. 2. From the time point t15, control circuit 37 alternately turns on and off switching devices 27 and 29 periodically at the on-off period T2, and charges bootstrap capacitor 43 periodically at charging period Sc1, similarly to the operations from the time point t3.

Control circuit 37 alternately turns on and off switching devices 27 and 29 once in each of cycle Cy2 in which bootstrap capacitor 43 is not charged and cycle Cy21 in which bootstrap capacitor 43 is charged. The length of cycle Cy2 is equal to that of the on-off period T2.

In the cycle Cy2 in which bootstrap capacitor 43 is not charged, control circuit 37 continuously turns on switching device 27 only for on-duration Ph2, continuously turns off switching device 27 a duration in the on-off period T2 other than the on-duration Ph2, continuously turns on switching device 29 only for on-duration Pd2, and continuously turns off switching device 29 a duration in the on-off period T2 other than the on-duration Pd2. The on-duration Ph2 of switching device 27 is each of a duration from time point t4 to time point t5, a duration from time point t8 to time point t9, and a duration from time point t16 to time point t17. The on-duration Pd2 of switching device 29 is each of a duration from time point t2 to time point t3, a duration from time point t6 to time point t7, and a duration from time point t18 to time point t19.

In the cycle Cy21 in which bootstrap capacitor 43 is charged, control circuit 37 continuously turns on switching device 27 only for on-duration Ph2, continuously turns off switching device 27 for a duration in duration T21 of cycle Cy2 other than the on-duration Ph2, continuously turns on switching device 29 only for on-duration Pd21, and continuously turns off switching device 29 for a duration in the duration T21 other than the on-duration Pd2. The on-duration Pd21 of switching device 29 is a duration from time point t10 to time point t15. Control circuit 37 calculates the on-duration Pd21 by adding sustaining duration Kt to the on-duration Pd2 of switching device 29 in the cycle Cy21 in which bootstrap capacitor 43 is not charged, and determines time point t15 to be a time point at which the on-duration Pd21 lapses from time point t10. In other words, control circuit 37 causes the on-duration Pd21 for which switching device 27 is continuously turned off and switching device 29 is continuously turned on to be longer than the on-duration Pd2 by a length of the sustaining duration Kt for which the inductor current IL shown in FIG. 2 is constant. This configuration allows a maximum value of the inductor current IL at time point t15 to be equal to a maximum value of the inductor current IL at any of time point t3 and time point t7, for instance, in the cycle Cy2 in which bootstrap capacitor 43 is not charged, as show in FIG. 2. This configuration can reduce a ripple current in output terminal 25 even when bootstrap capacitor 43 is charged. It was confirmed that the current ripple was reduced by about 30% by the above operation of actual stepping-up of the voltage more than a configuration in which this operation is not performed.

The boost operation discussed above will be summarized below. Control circuit 37 alternately turns on and off switching devices 27 and 29 with interruptions of the simultaneous-off durations Dt3 and Dt4. In order to charge bootstrap capacitor 43 circuit 37 continuously turns off switching device 27 and turning on switching device 29 for the sustaining duration Kt which is a total of the charging duration Pc1 for charging bootstrap capacitor 43 and simultaneous-off durations Dt1 and Dt2. According to Embodiment 1, the simultaneous-off durations Dt1 to Dt4 are equal to each other in length. In this case, control circuit 37 alternately turns on and off switching devices 27 and 29 with the simultaneous-off duration Dt3 in the on-and-off driving. In order to charge bootstrap capacitor 43, control circuit 37 continuously turns off switching device 17 and turning on switching device 19 for the sustaining duration Kt which is the total of the charging duration Pc1 for charging bootstrap capacitor 43 and simultaneous-off durations Dt1 and Dt2. In the case that the simultaneous-off durations Dt1 and Dt2 are identical to each other in length, the sustaining duration Kt is equal to the sum of twice the simultaneous-off duration Dt1 (Dt2) and the charging duration Pc1 in length. This configuration allows DC-DC converter 11 to reduce the ripple current during the boost operation.

As in conventional power supply circuit 500 show in FIGS. 7 and 8, the ripple current can be reduced even when the inductor current IL is not constant but changes in a declining slope by calculating and estimating timing in which the inductor current IL takes a maximum value based on the slope, and then controlling on and off operation of switching devices 27 and 29. In this case, however, the control becomes complex besides a possibility that calculation of timing cannot follow a change in the on-off period T2 when it is short since the calculation of the above timing needs to be carried out at maximum within the on-duration Pd2 of switching device 29. In DC-DC converter 11 according to Embodiment 1, the timing at which the inductor current IL becomes the largest can be calculated easily since bootstrap capacitor 43 is charged while the switching devices are controlled to allow the inductor current IL to be constant.

An operation of DC-DC converter 11 to step down input voltage Vi and to convert input voltage Vi into output voltage Vo will be described below. DC-DC converter 11 steps down input voltage Vi to output voltage Vo of a predetermined level when DC power supply 39 implemented by, e.g. a solar battery outputs a full power.

In order to step down the voltage, fundamentally, control circuit 37 alternately turns on and off switching devices 17 and 19 periodically at on-off frequency f1 while continuously turning on switching device 27 and continuously turning off switching device 29. That is, control circuit 37 alternately turns on and off switching devices 17 and 19 at a duty ratio determined by control circuit 37 within the on-off period T1 which is the inverse of on-off frequency f1. According to Embodiment 1, the on-off frequency f1 (i.e., on-off period T1) is equal to the on-off frequency f2 (i.e., on-off period T2) for the boost operation, the frequencies may be different from each other.

Figure 3:
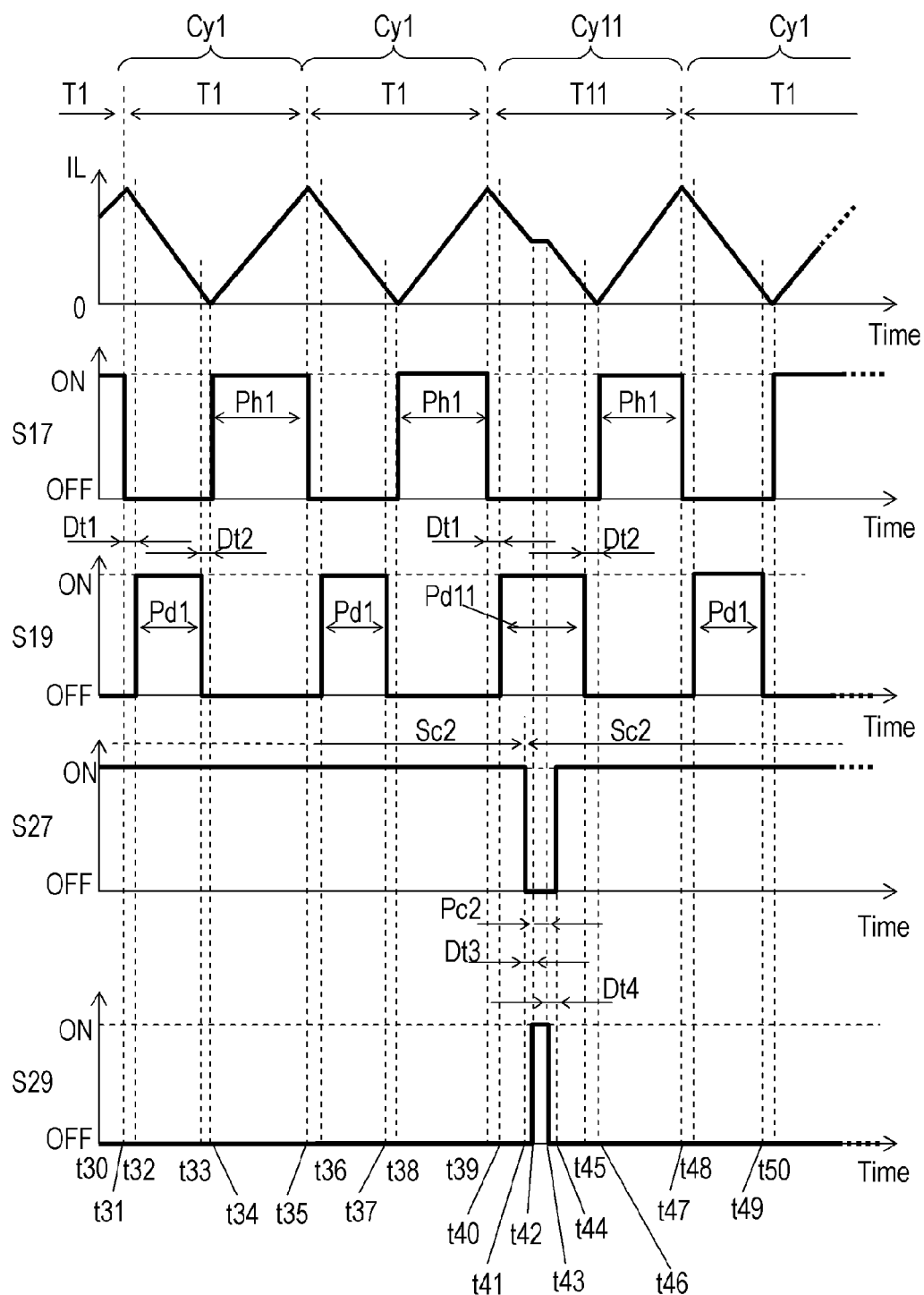
FIG. 3 shows voltages and currents in a buck operation of the DC-DC converter according to Embodiment 1.

FIG. 3 shows electric current IL that flows through inductor 35 of DC-DC converter 11 and switching signals S17, S19, S27 and S29 input to the gates of switching devices 17, 19, 27, and 29 during the buck operation. In FIG. 3, the horizontal axis represents time, and the vertical axis represents electric current and levels of the switching signals. In FIG. 3, items identical to those of FIG. 2 are denoted by the same reference numerals.

As shown in FIG. 3, at time point t30, switching device 17 is turned on and switching device 19 is turned off. After that, when the on-off period T1 quits at time point t31, the on and off states of switching devices 17 and 19 reverse after lapse of the simultaneous-off duration Dt1 for which both switching devices 17 and 19 are turned off. Control circuit 37 alternately turns on and off drives switching devices 17 and 19 with interruptions of the simultaneous-off durations Dt1 and Dt2 for which both switching devices 17 and 19 are continuously turned off.

Since switching device 17 is continuously turned on and switching device 19 is continuously turned off for a duration from time point t30 to time point t31, an electric power of DC power supply 39 is supplied to inductor 35. An inductor current IL thus flows from input terminal 13 to inductor 35 through switching device 17, and increases with lapse of time from time point t30 to time point t31, as shown in FIG. 3.

Next, a duration from time point t31 to time point t32 is the simultaneous-off duration Dt1 for which both switching devices 17 and 19 are turned off. As a result, an electric power stored in inductor 35 is supplied from output terminal 25 to load 41 through switching device 27 for the duration from time point t31 to time point t32 since only switching device 27 out of switching devices 17, 19, 27 and 29 is turned on whereas other switching devices 17, 19 and 29 are turned off. Parasitic diode 19D of switching device 19 is turned on at this moment to electrically connect inductor 35 with load 41. The inductor current IL therefore starts to decrease with lapse of time at the simultaneous-off duration Dt1, as shown in FIG. 3, since the inductor current IL flows to output terminal 25. The inductor current IL thus becomes largest at time point t31.

After that, switching device 19 is turned on at time point t32. Since parasitic diode 19D of switching device 19 is turned on at time point t31 before time point t32, as described above, the practical state of connection does not change even when switching device 19 is turned on under this condition. Therefore, the inductor current IL continuously decreases with lapse of time even after time point t32, as shown in FIG. 3.

After that, control circuit 37 turns off switching device 19 at time point t33 that precedes the simultaneous-off duration Dt2 before time point t34 at which half of the on-off period T1 lapses from time point t31. Since control circuit 37 stores values of the on-off period T1 and the simultaneous-off durations Dt1 and Dt2, control circuit 37 can determine time point t33 according to these values.

When switching device 19 is turned off at time point t33, it goes into the same state as that a time between time point t31 and time point t32. The inductor current IL thus continuously decreases with lapse of time, similarly to the duration from time point t31 to time point t32.

The inductor current IL becomes 0 (zero) at time point t34 which is a time point when half of the on-off period T1 lapses from time point t31, or when the simultaneous-off duration Dt2 lapses from time point t33. Control circuit 37 turns on switching device 17 at time point t34. Since this state is same as that from time point t30 to time point t31, the inductor current IL starts increasing with lapse of time again from time point t34, as shown in FIG. 3.

An operation from time point t35 to time point t38 is identical to that from time point t31 to time point t34 since various states after time point t34 are identical to those from time point t30. DC-DC converter 11 steps down input voltage Vi from DC power supply 39 to produce output voltage Vo by performing this operation repetitively, and outputs the output voltage Vo to load 41 from output terminal 25.

An operation for charging bootstrap capacitor 49 will be described below.

As described above, drive circuit 31 is activated with the electric power stored in bootstrap capacitor 49. Drive circuit 31 outputs a gate voltage to continuously turn on switching device 27 since switching device 27 is controlled by control circuit 37 to be continuously turned on during the buck operation. As a result, the electric power stored in bootstrap capacitor 49 to activate drive circuit 31 decreases with lapse of time. Therefore, control circuit 37 charges bootstrap capacitor 49 by performing the following procedure at regular intervals.

To be specific, control circuit 37 continuously turns on switching device 27 and turning off switching device 29 from time point t30 to time point t41, as shown in FIG. 3. Control circuit 37 then controls switching devices 27 and 29 in order to charge bootstrap capacitor 49 upon lapse of charging period Sc2. The charging period Sc2 is predetermined based on capacitance C2 of bootstrap capacitor 49 and power consumption of drive circuit 31. The charging period Sc2 is one millisecond, which is identical to charging period Sc1, according to the first embodiment. In other words, control circuit 37 turns off switching device 27 at time point t41 when the charging period Sc2 lapses. As a result, at time point t41, only switching device 19 is turned on, whereas other switching devices 17, 27 and 29 are turned off. However, since parasitic diode 27D of switching device 27 is turned on, the electric power stored in inductor 35 is supplied to load 41 through parasitic diode 27D of switching device 27 and switching device 19 that is turned on. Therefore, the inductor current IL continuously decreases with lapse of time still after time point t41.

Control circuit 37 turns on switching device 29 at time point t42 when simultaneous-off duration Dt3 lapses from time point t41. This operation allows the inductor current IL to flow through switching device 29 to the ground, and to return to inductor 35 through switching device 19 which is turned on, thus forming a circulating current IC. The inductor current IL therefore is constant after time point t42, as shown in FIG. 3.

Since switching device 29 turns on at time point t42, one end of bootstrap capacitor 49 becomes connected to the ground at time point t42. As a result, an electric current flows from driving power supply 53 to bootstrap capacitor 49 through diode 51, so that bootstrap capacitor 49 may be charged. The inductor current IL becomes constant even after time point t42 since circulating current IC continuously flows for the charging duration Pc2 that starts at time point t42 for charging bootstrap capacitor 49. The charging duration Pc2 is stored in control circuit 37 as a predetermined value.

Control circuit 37 turns off switching device 29 at time point t43 when charging duration Pc2 lapses from time point t42, as shown in FIG. 3. This interrupts the electric current that flows to bootstrap capacitor 49 to quit the charging of bootstrap capacitor 49. This state is identical to that from time point t41 to time point t42. Therefore, the inductor current IL starts flowing again into load 41 from time point t43, and decreasing, similarly to the duration from time point t41 to time point t42, as shown in FIG. 3.

Control circuit 37 turns on switching device 27 at time point t44 when simultaneous-off duration Dt4 lapses from time point t43, as shown in FIG. 3. This state is identical to that prior to time point t41. The inductor current IL therefore decreases continuously still after time point t44, as shown in FIG. 3.

Subsequent to that, control circuit 37 turns off switching device 19 at time point t45, as shown in FIG. 3. From the time point t45, control circuit 37 alternately turns on and off switching devices 17 and 19 periodically at the on-off period T1, and charges bootstrap capacitor 49 only for charging duration Pc2 periodically at charging period Sc2, similarly to the operation from the time point t33.

Control circuit 37 alternately turns on and off switching devices 17 and 19 once in each of plural cycles Cy1 in which bootstrap capacitor 49 is not charged and cycle Cy11 in which bootstrap capacitor 49 is charged. A length of the cycle Cy1 is identical to that of the on-off period T1.

In the cycle Cy1 in which bootstrap capacitor 49 is not charged, control circuit 37 continuously turns on switching device 17 for on-duration Ph1 and turning off switching device 17 for a duration in the on-off period T1 other than the on-duration Ph1, and continuously turns on switching device 19 only for on-duration Pd1 and continuously turns off switching device 19 a duration in the on-off period T1 other than the on-duration Pd1. The on-duration Ph1 of switching device 17 is each of a duration from time point t34 to time point t35, a duration from time point t38 to time point t39, and a duration from time point t46 to time point t47. The on-duration Pd1 of switching device 19 is each of a duration from time point t32 to time point t33, a duration from time point t36 to time point t37, and a duration from time point t48 to time point t49.

In the cycle Cy11 in which bootstrap capacitor 49 is charged, control circuit 37 continuously turns on switching device 17 for on-duration Ph1 and turning off switching device 17 for a duration in duration T11 having a width of cycle Cy11 other than the on-duration Ph1, and continuously turns on switching device 19 for on-duration Pd11 and turning off switching device 19 for a duration in the duration T11 other than the on-duration Pd11. The on-duration Pd11 of switching device 19 is a duration from time point t40 to time point t45. Control circuit 37 calculates the on-duration Pd11 by adding charging duration Pc2 to the on-duration Pd1 of switching device 19 in the cycle Cy1 in which bootstrap capacitor 49 is not charged, and determines a time point at which the on-duration Pd11 lapses from time point t40 as time point t45. In other words, control circuit 37 determines the on-duration Pd11 for which switching device 17 is continuously turned off and switching device 19 is continuously turned on to be longer than the on-duration Pd1 by a length of the charging duration Pc2 for which the inductor current IL is constant shown in FIG. 3. This operation allows a maximum value of the inductor current IL at time point t47 when the inductor current IL becomes the largest to be equal to a maximum value of the inductor current IL (i.e., inductor current IL at, e.g. time point t31 time point t35, and time point t37) in the cycle Cy1 in which bootstrap capacitor 49 is not charged, as show in FIG. 3. As a result, a ripple current at output terminal 25 can be reduced even when bootstrap capacitor 49 is charged. It was confirmed that the current ripple was reduced by about 10% by the buck operation more than the case in which this operation is not performed.

The buck operation of DC-DC converter 11 will be summarized below. Control circuit 37 alternately turns on and off switching devices 17 and 19 with interruptions of the simultaneous-off durations Dt1 and Dt2. In order to charge bootstrap capacitor 49, control circuit 37 continuously turns off switching device 17 and turning on switching device 19 for the charging duration Pc2 to charge bootstrap capacitor 49. This operation allows DC-DC converter 11 to reduce the ripple current in the buck operation.

The ripple current in the buck operation can be reduced similarly to the boost operation even when the inductor current IL is not constant but changes along a declining slope shown in FIG. 8 for conventional power supply circuit 500 shown in FIG. 7, by calculating and estimating, based on the slope, timing at which the inductor current IL becomes a maximum value, and then, controlling the on and off operation of switching devices 17 and 19. It is likely, however, that the control becomes complex, in addition to a possibility that the calculation and estimation of the above-stated timing take time. It is therefore preferable that the timing at which the inductor current IL becomes the highest can be calculated easily even in the buck operation by controlling the switching devices to allow the inductor current IL to be constant when charging bootstrap capacitor 49.

As described above, DC-DC converter 11 is configured to output the output voltage Vo obtained by converting input voltage Vi. DC-DC converter 11 includes input terminal 13 configured to receive input voltage Vi, output terminal 25 configured to output the output voltage Vo, ground terminal 15, switching device 17 electrically connected in series between input terminal 13 and ground terminal 15, switching device 19 electrically connected in series with switching device 17 at node 17P and between input terminal 13 and ground terminal 15, drive circuit 21 that turns on and off switching device 17, bootstrap capacitor circuit 61 electrically connected to drive circuit 21, drive circuit 23 that turns on and off switching device 19, switching device 27 electrically connected in series between output terminal 25 and ground terminal 15, switching device 29 electrically connected in series with switching device 27 at node 27P and between output terminal 25 and ground terminal 15, drive circuit 31 that turns on and off switching device 27, bootstrap capacitor circuit 71 electrically connected to drive circuit 31, drive circuit 33 that turns on and off switching device 29, inductor 35 electrically connected in series between nodes 17P and 27P, and control circuit 37 electrically connected with drive circuits 21, 23, 31 and 33. Bootstrap capacitor circuits 61 and 71 include bootstrap capacitors 43 and 49, respectively.

In the case that the output voltage Vo is higher than the input voltage Vi, control circuit 37 controls drive circuits 21, 23, 31, and 33 to perform the following operations. That is, control circuit 37 alternately turns on and off switching device 27 and 29 periodically at on-off period T2 such that switching device 29 is turned on subsequently to simultaneous-off duration Dt3 for which both of switching devices 27 and 29 are turned off subsequently after switching device 27 is turned off, and switching device 27 is turned on subsequently to simultaneous-off duration Dt4 for which both of switching devices 27 and 29 are turned off subsequently after switching device 29 is turned off. Control circuit 27 alternately turns on and off switching devices 17 and 19 such that switching device 19 is turned on subsequently to simultaneous-off duration Dt1 for which both of switching devices 17 and 19 are turned off subsequently after switching device 17 is turned off, and switching device 17 is turned on subsequently to simultaneous-off duration Dt2 for which both of switching devices 17 and 19 are turned off subsequently after switching device 19 is turned off, so as to charge bootstrap capacitor 43 by continuously turning on switching device 19 for charging duration Pc1 while continuously turning off switching device 17 for sustaining duration Kt that is a total of simultaneous-off duration Dt1, simultaneous-off duration Dt2, and charging duration Pc1.

In the case that the output voltage Vo is lower than the input voltage Vi, control circuit 37 controls drive circuits 21, 23, 31, and 33 to perform the following operations. That is, control circuit 37 alternately turns on and off switching devices 17 and 19 periodically at on-off period T1 such that switching device 19 is turned on subsequently to simultaneous-off duration Dt1 subsequently after switching device 17 is turned off, and switching device 17 is turned on subsequently to simultaneous-off duration Dt2 subsequently after switching device 19 is turned off. Control circuit 37 alternately turns on and off switching devices 27 and 29 via simultaneous-off durations Dt3 and Dt4, so as to charge bootstrap capacitor 49 by continuously turning on switching device 29 for charging duration Pc2 while continuously turning off switching device 27.

In the case that the output voltage Vo is higher than the input voltage Vi, control circuit 37 may control drive circuits 21, 23, 31, and 33 to the following operations. That is, control circuit 37 alternately turns on and off switching devices 27 and 29 periodically at on-off period T2 such that switching device 27 is continuously turned on for plural on-durations Pd2 and Pd21. Control circuit 37 continuously turns on switching device 17 and turning off switching device 19 so as not to charge bootstrap capacitor 43 for certain on-duration Pd2 out of plural on-durations Pd2 and Pd21. Control circuit 37 charges bootstrap capacitor 43 by continuously turning on switching device 19 for charging duration Pc1 while continuously turning off switching device 17 for sustaining duration Kt in further on-duration Pd21 out of plural on-durations Pd2 and Pd21. Further on-duration Pd21 is longer than certain on-duration Pd2 by a length of sustaining duration Kt.

In the case that the output voltage Vo is lower than the input voltage Vi, control circuit 37 may control drive circuit 21, 23, 31, and 33 to perform the following operations. That is, control circuit 37 alternately turns on and off switching devices 17 and 19 periodically at on-off period T1 such that switching device 117 is continuously turned on for plural on-durations Pd1 and Pd11. Control circuit 37 continuously turns on switching device 27 and turning off switching device 29 so as not to charge bootstrap capacitor 49 for certain on-duration Pd1 out of plural on-durations Pd1 and PD11. Control circuit 37 charges bootstrap capacitor 49 by continuously turning off switching device 27 and continuously turning on switching device 29 for charging duration Pc2 in further on-duration Pd11 out of plural on-durations Pd1 and Pd11. Further on-duration Pd11 is longer than certain on-duration Pd1 by a length of charging duration Pc2.

The simultaneous-off duration Dt1 may be identical to the simultaneous-off duration Dt2 in length. The simultaneous-off duration Dt3 may be identical to the simultaneous-off duration Dt4 in length. The simultaneous-off durations Dt1 to Dt4 may be identical to each other in length. The simultaneous-off durations Dt3 and Dt4 may be identical to the simultaneous-off durations Dt1 and Dt2, respectively. The on-off period T2 may be identical to the on-off period T1 in length.

With the above structure and operations, the inductor current IL becomes constant while bootstrap capacitor 43 or 49 is charged during either of the boost operation and the buck operation. The peak value of the inductor current IL therefore becomes steady without causing a shift even when the on-off operation of the switching devices is restarted thereafter during the boost and buck operations. DC-DC converter 11 can stabilize the output current and reduce the ripple current generated due to the charging of bootstrap capacitors 43 and 49.

Exemplary Embodiment 2

Figure 4:
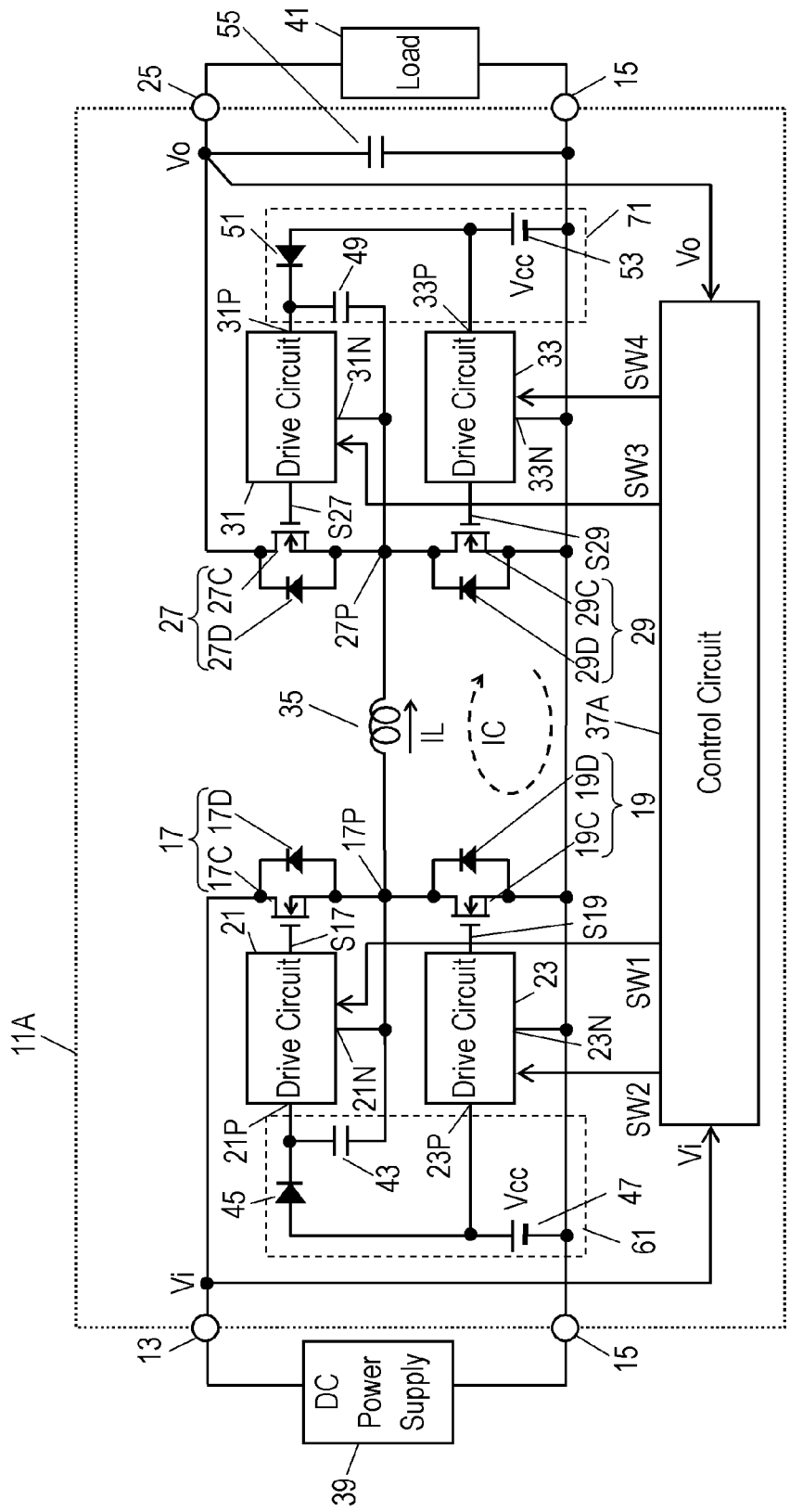
FIG. 4 is a circuit block diagram of a DC-DC converter according to Exemplary Embodiment 2 of the present invention.

FIG. 4 is a circuit block diagram of DC-DC converter 11A according to Exemplary Embodiment 2 of the present invention. In FIG. 4, components identical to those of DC-DC converter 11 according to Embodiment 1 shown in FIG. 1 are denoted by the same reference numerals. DC-DC converter 11A includes control circuit 37A in place of control circuit 37 of DC-DC converter 11 shown in FIG. 1. Control circuit 37A is different from control circuit 37 shown in FIG. 1 in timing of turning on and off of switching devices 17, 19, 27 and 29.

In DC-DC converter 11A according to Embodiment 2, control circuit 37A starts the operation for sustaining duration Kt for which switching device 29 turns on so as to charge bootstrap capacitor 43 in the case that input voltage Vi is stepped up and output from output terminal 25. In addition, at the time point when switching device 19 is turned off, control circuit 37A quits the operation for charging duration Pc2 so as to charge bootstrap capacitor 49 in the case that input voltage Vi is stepped down and output from output terminal 25.

As a result, the inductor current IL becomes the smallest in the sustaining duration Kt in addition to reducing a ripple current, similarly to DC-DC converter 11 according to Embodiment 1. Therefore, the electric currents that flow through switching devices 19 and 29 can be reduced when bootstrap capacitors 43 and 49 are charged, thereby allowing DC-DC converter 11A to improve the efficiency in charging bootstrap capacitors 43 and 49.

A structure and operation of DC-DC converter 11A according to Embodiment 2 will be detailed below. Similar to DC-DC converter 11 according to Embodiment 1, DC power supply 39 of DC-DC converter 11A according to Embodiment 2 is implemented by a solar battery outputting voltage Vi changing depending on, e.g. seasons, weather conditions, and shadow. DC-DC converter 11 steps up and down input voltage Vi which changes, and outputs constant voltage Vo.

Figure 5:
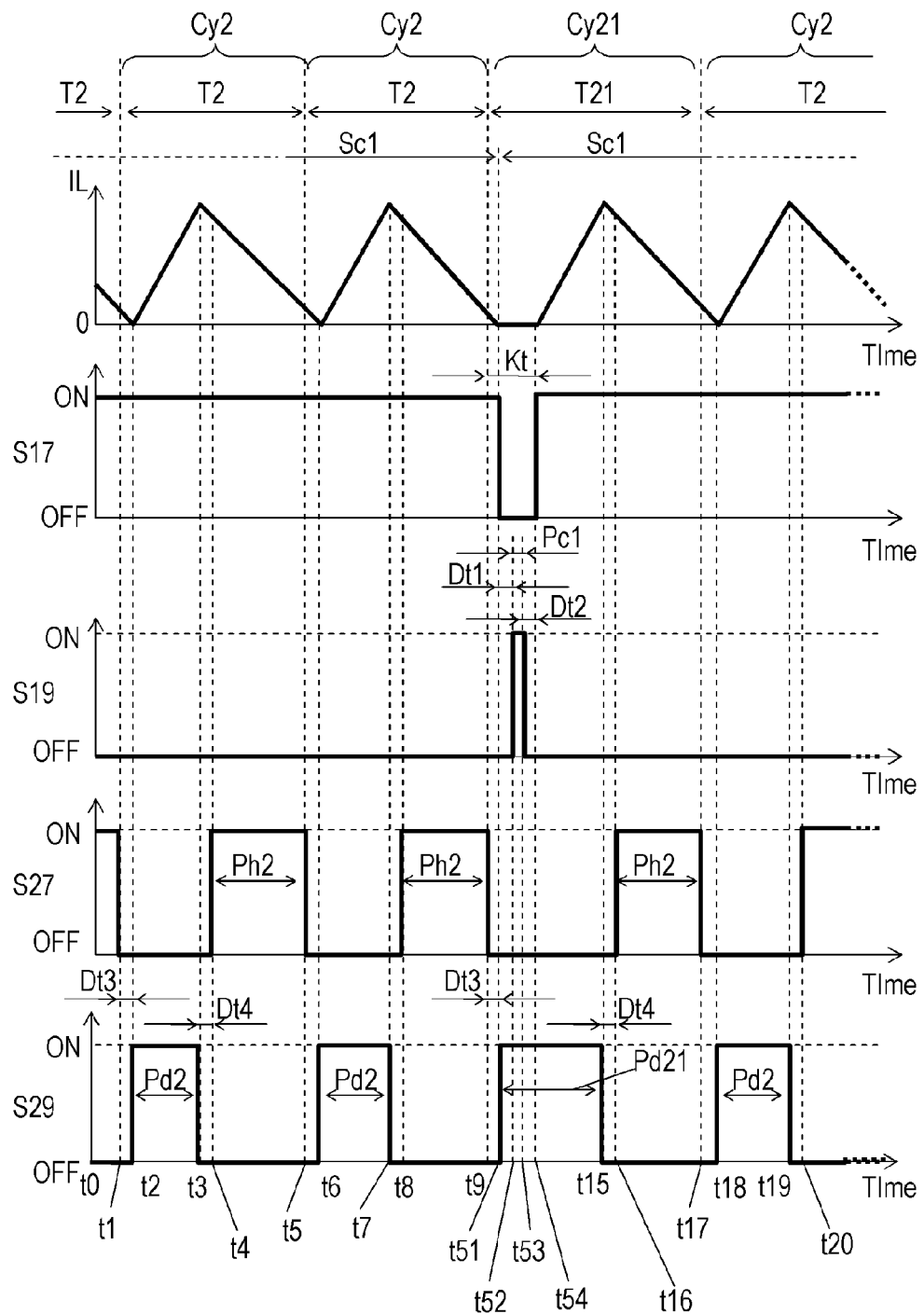
FIG. 5 is shows voltages and currents in a boost operation of the DC-DC converter according to Embodiment 2.

A boost operation of the DC-DC converter 11A will be described below. FIG. 5 shows inductor current IL that flows through inductor 35 and switching signals S17, S19, S27 and S29 input to gates of switching devices 17, 19, 27 and 29, respectively, during the boost operation of DC-DC converter 11A. In FIG. 5, the horizontal axis represents time, and the vertical axis represents electric current and levels of switching signals. In FIG. 8, items identical to those of FIG. 2 of DC-DC converter 11 according to Embodiment 1 are denoted by the same reference numerals. Control circuit 37A of DC-DC converter 11A turns on and off switching devices 17, 19, 27 and 29 from time point t0 to time point t9 similarly to the operations in cycle Cy2 shown in FIG. 2 of control circuit 37 of DC-DC converter 11.

Next, control circuit 37A turns on switching device 29 at time point t51 when simultaneous-off duration Dt3 lapses from time point t9, and turns off switching device 17 for cycle Cy21 in which bootstrap capacitor 43 is charged. As a result, only switching device 29 is continuously turned on from time point t51 while other switching devices 17, 19 and 27 are continuously turned off. Although this state is identical to the state from time point t11 shown in FIG. 2, the inductor current IL that flows through inductor 35 from time point t51 is 0 (zero) in DC-DC converter 11A according to Embodiment 2 since the inductor current IL becomes 0 (zero) at time point t51, as shown in FIG. 5.

After that, control circuit 37A turns on switching device 19 at time point t52 when the simultaneous-off duration Dt1 lapses from time point t51. Bootstrap capacitor 43 is hence charged with the electric current that flows from driving power supply 47. The inductor current IL is 0 (zero) in this state, as shown in FIG. 5.

After that, control circuit 37A quits charging bootstrap capacitor 43 by turning off switching device 19 at time point t53 when the charging duration Pc1 lapses from time point t52, as shown in FIG. 5. The inductor current IL is kept 0 (zero) continuously thereafter, as shown in FIG. 5, since the state subsequent to time point t53 is identical to the state from time point t51 to time point t52. The duration from time point t51 to time point t54 is sustaining duration Kt for which the inductor current IL is kept at a fixed value of 0 (zero).

After that, control circuit 37A turns on switching device 17 at time point t54 when the simultaneous-off duration Dt2 lapses from time point t53. As a result, the inductor current IL increases with lapse of time from time point t54, as shown in FIG. 5, since it goes into the same state as time point t6. DC-DC converter 11A operates thereafter similarly to DC-DC converter 11 according to Embodiment 1 shown in FIG. 2.

In DC-DC converter 11A according to Embodiment 2, the inductor current IL is 0 (zero) while bootstrap capacitor 43 is charged, as described above. Therefore, the electric currents that flow through switching devices 19 and 29 become 0 (zero) since circulating current IC that flows in DC-DC converter 11 according to Embodiment 1 shown in FIG. 1 does not flow. This configuration reduces a loss in switching devices 19 and 29, and hence improves the efficiency. Since a difference in the operation of DC-DC converter 11A according to Embodiment 2 from DC-DC converter 11 according to Embodiment 1 is the timing to perform the operation for charging bootstrap capacitor 43, DC-DC converter 11A can provide an effect of reducing the ripple current similarly to DC-DC converter 11 according to Embodiment 1.

As described, DC-DC converter 11A according to Embodiment 2 has an advantage of charging bootstrap capacitor 43 efficiently while reducing the ripple current.

Figure 6:
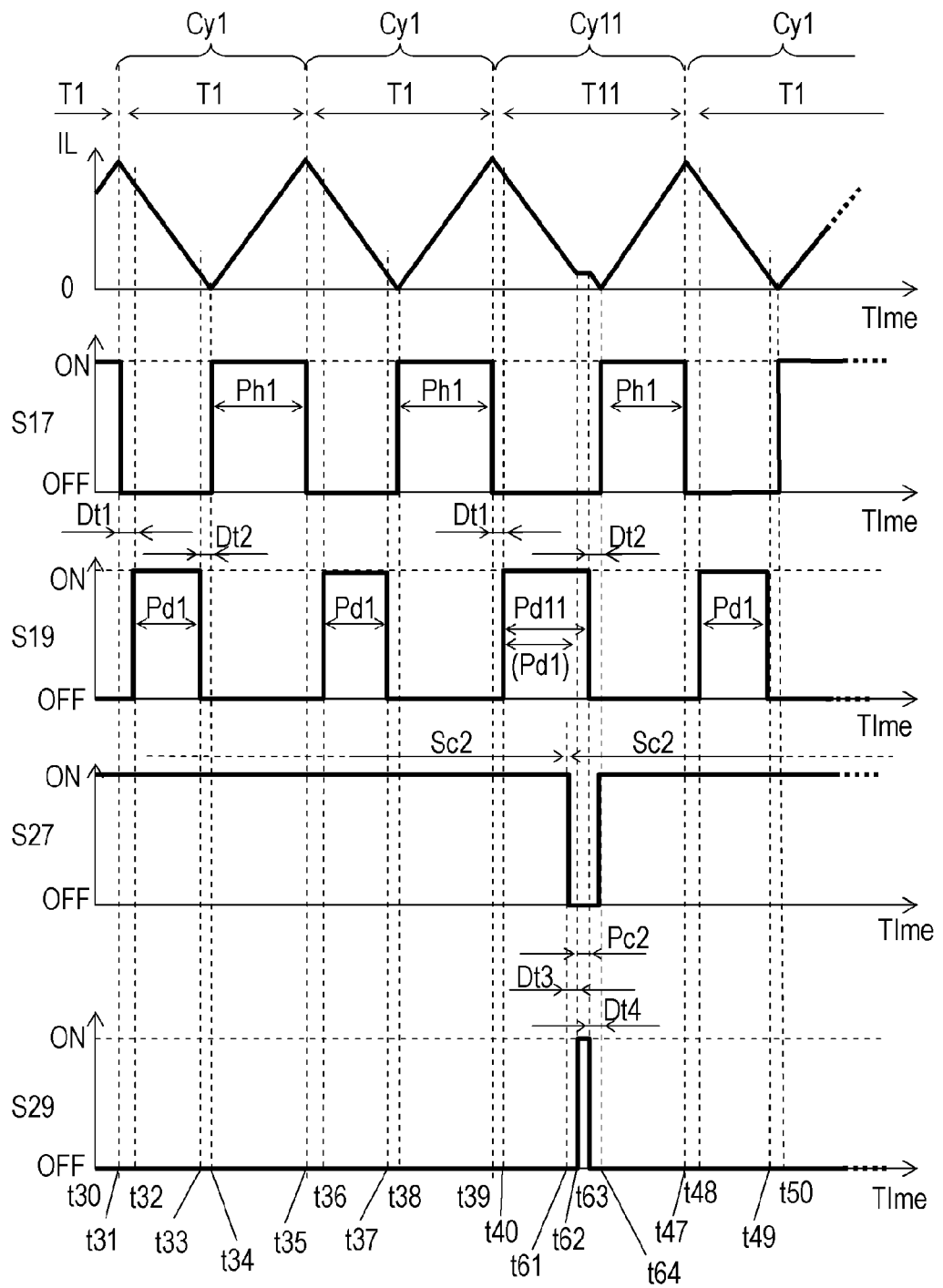
FIG. 6 shows voltages and currents in a buck operation of the DC-DC converter according Embodiment 2.

A buck operation of the DC-DC converter 11A will be described below. FIG. 6 shows inductor current IL that flows through inductor 35 and switching signals S17, S19, S27 and S29 input to gates of switching devices 17, 19, 27 and 29, respectively, during the buck operation of DC-DC converter 11A. In FIG. 6, the horizontal axis represents time, and the vertical axis represents electric current and levels of switching signals. In FIG. 6, items identical to those of FIG. 3 of DC-DC converter 11 according to Embodiment 1 are denoted by the same reference numerals. Control circuit 37A of DC-DC converter 11A turns on and off switching devices 17, 19, 27 and 29 from time point t30 to time point t40, similarly to the operates for cycle Cy1 shown in FIG. 3 of control circuit 37 of DC-DC converter 11.

After that, control circuit 37A turns off switching device 27 at time point t61, as shown in FIG. 6. Time point t61 can be obtained as follows.

In cycle Cy1 in which bootstrap capacitor 49 is not charged, control circuit 37A turns on switching device 19 for on-duration Pd1 from time point t32 to time point t33, for instance. Therefore, switching device 19 is continuously turned on until time point t62 when the on-duration Pd1 lapses from time point t40 if bootstrap capacitor 49 is not charged after time point t40. In DC-DC converter 11A according to Embodiment 2, however, the inductor current IL does not change though control circuit 37A continuously turns on switching device 19 for charging duration Pc2 for which bootstrap capacitor 49 is charged in the buck operation, similarly to Embodiment 1. The charging duration Pc2 for charging bootstrap capacitor 49 starts at time point t62. Similarly to Embodiment 1, simultaneous-off durations Dt3 and Dt4 are provided before and after the charging duration Pc2, respectively. Therefore, control circuit 37A determines time point t61 to be a time point that precedes time point t62 by a length of simultaneous-off duration Dt3. Since the charging duration Pc2, the simultaneous-off durations Dt3 and Dt4, and the on-duration Pd1 of switching device 19 from time point t32 to time point t33 in the cycle Cy1 in which bootstrap capacitor 49 is not charged are known, control circuit 37A can determine time point t61 based on these known values. To be specific, time point t61 is a time point after time point t40 by a length of a time obtained by subtracting the simultaneous-off duration Dt3 from the on-duration Pd1.

When control circuit 37A turns off switching device 27 at time point t61, only switching device 19 is turned on whereas other switching devices 17, 27 and 29 are turned off from time point t61. Consequently, the inductor current IL continuously decreases similarly to that from time point t41 to time point t42 shown in FIG. 3 of DC-DC converter 11 according to Embodiment 1.

After that, control circuit 37A turns on switching device 29 at time point t62 when the simultaneous-off duration Dt3 lapses from time point t61. This state is identical to that for the duration from time point t42 to time point t43 shown in FIG. 3 of DC-DC converter 11 according to Embodiment 1 in which bootstrap capacitor 49 is charged with the electric current from driving power supply 53 for the charging duration Pc2 from time point t62 to time point t63. The inductor current IL is constant and circulating current IC flows for the charging duration Pc2, similarly to Embodiment 1.

After that, control circuit 37A turns off switching device 19 and switching device 29 simultaneously to complete the charge of bootstrap capacitor 49 at time point t63 when the charging duration Pc2 ends. As a result, all switching devices are turned off from time point t63. The inductor current IL is constant and circulating current IC flows until time point t63. Since all switching devices 17, 19, 27 and 29 (i.e., switches 17C, 19C, 27C and 29C) are turned off from time point t63, the circulating current IC does not flow, but the inductor current IL flows toward load 41 through parasitic diode 27D of switching device 27. As a result, the inductor current IL decreases again with lapse of time from time point t63, as shown in FIG. 6.

After that, control circuit 37A turns on switching devices 17 and 27 simultaneously at time point t64 when the simultaneous-off duration Dt4 lapses from time point t63. The inductor current IL becomes 0 (zero) at time point t64, as shown in FIG. 6. A duration for which the inductor current IL becomes 0 (zero) from a maxima value thereof (e.g. a duration from time point t31 to time point t34) in the normal cycle Cy1 for which bootstrap capacitor 49 is not charged is known as a total length of the on-duration Pd1 of switching device 19 and the simultaneous-off durations Dt1 and Dt2. The charging duration Pc2 is also known. Therefore, control circuit 37A can determine time point t64 to be a time point lapses from time point t39 by a total duration of the on-duration Pd1, the simultaneous-off durations Dt1 and Dt3, and the charging duration Pc2.

In the states of the switching devices at time point t64, the inductor current IL increases, similarly to, for example, the states at time point t34 shown in FIG. 3 of DC-DC converter 11 according to Embodiment 1. The simultaneous-off durations Dt2 and Dt4 are equal to each other since control circuit 37A turns on switching devices 17 and 27 simultaneously at time point t64. Control circuit 37A may turn on switching device 27 after time point t63 and before time point t64 in order to cause the inductor current IL to start increasing at time point t64. In other words, the simultaneous-off duration Dt4 may be shorter than the simultaneous-off duration Dt2, that is, the simultaneous-off duration Dt4 is not longer than the simultaneous-off duration Dt2.

The inductor current IL becomes smaller than that of DC-DC converter 11 according to Embodiment 1, and reaches a value closest to 0 (zero) while bootstrap capacitor 49 is charged. Since the electric current that flows through switching devices 19 and 29 thus becomes smallest, the loss in switching devices 19 and 29 can be reduced, thereby improving the efficiency of DC-DC converter 11A similarly to the boost operation. The operation of DC-DC converter 11A according to Embodiment 2 is different from DC-DC converter 11 according to Embodiment 1 only in the timing of charging bootstrap capacitor 49. DC-DC converter 11A according to Embodiment 2 can hence provide an effect of reducing the ripple current similarly to DC-DC converter 11 according to Embodiment 1. Thus, DC-DC converter 11A according to Embodiment 2 provides an advantage of charging bootstrap capacitor 49 efficiently while reducing the ripple current even in the buck operation.

The inductor current IL does not become 0 (zero) when bootstrap capacitor 49 is charged during the buck operation for the reason below. If the inductor current IL becomes 0 (zero) while bootstrap capacitor 49 is charged, control circuit 37A is required to control switching devices 17 and 29 such that switching device 29 is turn off almost simultaneously when switching device 17 is turned on at the end of charging duration Pc2. However, it is practically difficult to control the timing. The charge of bootstrap capacitor 49 therefore quits at time point t63 that precedes time point t64 where the inductor current IL becomes 0 (zero) by a length of the simultaneous-off duration Dt4 for which both switching devices 27 and 29 are continuously turned off simultaneously. Accordingly, the inductor current IL does not become to 0 (zero) when bootstrap capacitor 49 is charged of DC-DC converter 11A according to Embodiment 2.

As described above, in the case that the output voltage Vo is higher than the input voltage Vi, control circuit 37 may control drive circuits 21, 23, 31, and 33 so as to start the sustaining duration Kt simultaneously when switching device 29 is turned on while alternately turning on and off switching devices 27 and 29 periodically at the on-off period T2.

In the case that the output voltage Vo is lower than the input voltage Vi, control circuit 37 may control drive circuits 21, 23, 31, and 33 so as to quit the charging duration Pc2 simultaneously when switching device 19 is turned off while alternately turning on and off switching devices 17 and 19 periodically at the on-off period T1. The simultaneous-off duration Dt4 may be shorter than the simultaneous-off duration Dt2.

With the above structure and operation, DC-DC converter 11A according to Embodiment 2 can minimize a current when the inductor current IL is maintained, in addition to reducing the ripple current, similarly to Embodiment 1. DC-DC converter 11A can thus reduce an amount of the current that flows through switching devices 19 and 29 when bootstrap capacitor 49 is charged, and improve the efficiency of the charging of bootstrap capacitor 49.

All of the specific values of various parameters (e.g. on-off frequencies f1 and f2 and charging periods Sc1 and Sc2) of DC-DC converters 11 and 11A according to Embodiments 1 and 2 are just examples, and suitable values can be determined as appropriate according to required specifications of DC-DC converters 11 and 11A.

In DC-DC converters 11 and 11A according to Embodiments 1 and 2, the simultaneous-off duration for which the switching devices are alternately turned on and off periodically are identical to the simultaneous-off durations of the two switching devices before and after the bootstrap capacitor is charged. In other words, all the simultaneous-off durations Dt1 to Dt4 are identical to each other in the boost and buck operations. As a result, switching devices 17, 19, 27 and 29 can be controlled easily even when the boost operation and the buck operation are switched. However, the simultaneous-off durations Dt1 to Dt4 may be different from one another according to specifications of the individual switching devices if the switching devices are of different types carrying large currents and small currents in DC-DC converters 11 and 11A.

DC-DC converters 11 and 11A according to Embodiments 1 and 2 are configured to step up and down voltage Vi of DC power supply 39 implemented by a solar battery and output constant voltage Vo, this is not restrictive. DC-DC converters 11 and 11A may be configured to stabilize output voltage Vo in general when input voltage Vi changes.

INDUSTRIAL APPLICABILITY

A DC-DC converter according to the present invention provides a small current ripple and stabilizes the voltage, hence being and is useful especially as a DC-DC converter for stepping up and down the voltage.

REFERENCE MARKS IN THE DRAWINGS

11 DC-DC converter
11A DC-DC converter
13 input terminal
15 ground terminal
17 switching device (first switching device)
19 switching device (second switching device)
21 drive circuit (first drive circuit)
23 drive circuit (second drive circuit)
25 output terminal
27 switching device (third switching device)
29 switching device (fourth switching device)
31 drive circuit (third drive circuit)
33 drive circuit (fourth drive circuit)
35 inductor
37 control circuit
37A control circuit
43 bootstrap capacitor (first bootstrap capacitor)
49 bootstrap capacitor (second bootstrap capacitor)
Dt1 simultaneous-off duration (third simultaneous-off duration)
Dt2 simultaneous-off duration (fourth simultaneous-off duration)
Dt3 simultaneous-off duration (first simultaneous-off duration)
Dt4 simultaneous-off duration (second simultaneous-off duration)
Pc1 charging duration (first charging duration)
Pc2 charging duration (second charging duration)
Pd1 on-duration (certain on-duration, second on-duration, certain second on-duration)
Pd2 on-duration (first on-duration, certain first on-duration)
Pd11 on-duration (further on-duration, second on-duration, further second on-duration)
Pd21 on-duration (first on-duration, further first on-duration)
T1 on-off duration (second on-off duration)
T2 on-off duration (first on-off duration)

The invention claimed is:

1. A DC-DC converter configured to output an output voltage obtained by converting an input voltage, the converter comprising:
an input terminal configured to receive the input voltage;
an output terminal configured to output the output voltage;
a ground terminal;
a first switching device electrically connected in series between the input terminal and a first node;
a second switching device electrically connected in series with the first switching device at the first node and between the input terminal and the first node;
a first drive circuit for turning on and off the first switching device;
a first bootstrap capacitor circuit electrically connected to the first drive circuit, the first bootstrap capacitor circuit including a first bootstrap capacitor;
a second drive circuit for turning on and off the second switching device;
a third switching device electrically connected in series between the output terminal and a second node;
a fourth switching device electrically connected in series with the third switching device at the second node and between the second node and the ground terminal;
a third drive circuit for turning on and off the third switching device;
a second bootstrap capacitor circuit electrically connected to the third drive circuit, the second bootstrap capacitor circuit including a second bootstrap capacitor;
a fourth drive circuit for turning on and off the fourth switching device;
an inductor electrically connected in series between the first node and the second node; and
a control circuit electrically connected with the first drive circuit, the second drive circuit, the third drive circuit, and the fourth drive circuit,
wherein, in a case that the output voltage is higher than the input voltage, the control circuit controls the first drive circuit, the second drive circuit, the third drive circuit and the fourth drive circuit as to:
alternately turn on and off the third switching device and the fourth switching device periodically at a first on-off period such that the fourth switching device is turned on subsequently to a first simultaneous-off duration for which both of the third switching device and the fourth switching device are turned off subsequently after the third switching device is turned off, and the third switching device is turned on subsequently to a second simultaneous-off duration for which both of the third switching device and the fourth switching device are turned off subsequently after the fourth switching device is turned off, and alternately turn on and off the first switching device and the second switching device such that the second switching device is turned on subsequently to a third simultaneous-off duration for which both of the first switching device and the second switching device are turned off subsequently after the first switching device is turned off, and the first switching device is turned on subsequently to a fourth simultaneous-off duration for which both of the first switching device and the second switching device are turned off subsequently after the second switching device is turned off, so as to charge the first bootstrap capacitor by continuously turning on the second switching device for a first charging duration while continuously turning off the first switching device for a sustaining duration that is a total of the third simultaneous-off duration, the fourth simultaneous-off duration, and the first charging duration, and wherein, in a case that the output voltage is lower than the input voltage, the control circuit controls the first drive circuit, the second drive circuit, the third drive circuit and the fourth drive circuit so as to:

alternately turn on and off the first switching device and the second switching device periodically at a second on-off period such that the second switching device is turned on subsequently to the third simultaneous-off duration subsequently after the first switching device is turned off, and the first switching device is turned on subsequently to the fourth simultaneous-off duration subsequently after the second switching device is turned off; and alternately turn on and off the third switching device and the fourth switching device such that the fourth switching device is turned on subsequent to the first simultaneous-off duration subsequently after the third switching device is turned off, and the third switching device is turned on subsequently to the second simultaneous-off duration subsequently after the fourth switching device is turned off, so as to charge the second bootstrap capacitor by continuously turning on the fourth switching device for a second charging duration while continuously turning off the third switching device.

2. The DC-DC converter according to claim 1, wherein, in the case that the output voltage is higher than the input voltage, the control circuit controls the first drive circuit, the second drive circuit, the third drive circuit and the fourth drive circuit so as to start the sustaining duration simultaneously when the fourth switching device is turned on while alternately turning on and off the third switching device and the fourth switching device periodically at the first on-off period.

3. The DC-DC converter according to claim 1, wherein, in the case that the output voltage is lower than the input voltage, the control circuit controls the first drive circuit, the second drive circuit, the third drive circuit and the fourth drive circuit so as to quit the second charging duration simultaneously when the second switching device is turned off while alternately turning on and off the first switching device and the second switching device periodically at the second on-off period.

4. The DC-DC converter according to claim 3, wherein the second simultaneous-off duration is not longer than the fourth simultaneous-off duration.

5. The DC-DC converter according to claim 3, wherein the second simultaneous-off duration is shorter than the fourth simultaneous-off duration.

6. The DC-DC converter according to claim 1, wherein, in the case that the output voltage is higher than the input voltage, the control circuit controls the first drive circuit, the second drive circuit, the third drive circuit and the fourth drive circuit so as to:

alternately turn on and off the third switching device and the fourth switching device periodically at the first on-off period such that the third switching device is continuously turned on for a plurality of first on-durations;

continuously turn on the first switching device and continuously turn off the second switching device so as not to charge the first bootstrap capacitor for a certain first on-duration out of the plurality of first on-durations;

charge the first bootstrap capacitor by continuously turning on the second switching device for the first charging duration while continuously turning off the first switching device for the sustaining duration in a further first on-duration out of the plurality of first on-durations; and cause the further first on-duration to be longer than the certain first on-duration by a length of the sustaining duration.

7. The DC-DC converter according to claim 6, wherein, in the case that the output voltage is lower than the input voltage, the control circuit controls the first drive circuit, the second drive circuit, the third drive circuit and the fourth drive circuit so as to:

alternately turn on and off the first switching device and the second switching device periodically at the second on-off period such that the first switching device is continuously turned on for a plurality of second on-durations;

continuously turn on the third switching device and continuously turn off the fourth switching device so as not to charge the second bootstrap capacitor for a certain second on-duration out of the plurality of second on-durations;

charge the second bootstrap capacitor by continuously turning off the third switching device and continuously turning on the fourth switching device for the second charging duration in a further second on-duration out of the plurality of second on-durations; and cause the further second on-duration to be longer than the certain second on-duration by a length of the second charging duration.

8. The DC-DC converter according to claim 1, wherein, in the case that the output voltage is lower than the input voltage, the control circuit controls the first drive circuit, the second drive circuit, the third drive circuit and the fourth drive circuit so as to:

alternately turn on and off the first switching device and the second switching device periodically at the second on-off period such that the first switching device is continuously turned on for a plurality of on-durations;

continuously turn on the third switching device and turning off the fourth switching device so as not to charge the second bootstrap capacitor for a certain on-duration out of the plurality of on-durations;

charge the second bootstrap capacitor by continuously turning off the third switching device and continuously turning on the fourth switching device for the second charging duration in a further on-duration out of the plurality of on-durations; and cause the further on-duration to be longer than the certain on-duration by a length of the second charging duration.

9. The DC-DC converter according to claim 1, wherein the first simultaneous-off duration is equal in length to the second simultaneous-off duration.

10. The DC-DC converter according to claim 9, wherein the third simultaneous-off duration is equal in length to the fourth simultaneous-off duration.

11. The DC-DC converter according to claim 10, wherein the first simultaneous-off duration is equal in length to the third simultaneous-off duration.

12. The DC-DC converter according to claim 1, wherein the third simultaneous-off duration is equal in length to the fourth simultaneous-off duration.

13. The DC-DC converter according to claim 1, wherein the first on-off period is equal in length to the second on-off period.

14. The DC-DC converter according to claim 1, wherein each of the first switching device, the second switching device, the third switching device and the fourth switching device includes a switch controlled by the control circuit, and a parasitic diode connected in parallel with the switch.

15. A DC-DC converter configured to output an output voltage obtained by converting an input voltage, the converter comprising:

an input terminal configured to receive the input voltage;
an output terminal configured to output the output voltage;
a ground terminal;
a first switching device electrically connected in series between the input terminal and the ground terminal;
a second switching device electrically connected in series with the first switching device at a first node and between the input terminal and the ground terminal;
a first drive circuit for turning on and off the first switching device;
a first bootstrap capacitor circuit electrically connected to the first drive circuit, the first bootstrap capacitor circuit including a first bootstrap capacitor;
a second drive circuit for turning on and off the second switching device;
a third switching device electrically connected in series between the output terminal and the ground terminal;
a fourth switching device electrically connected in series with the third switching device at a second node and between the output terminal and the ground terminal;
a third drive circuit for turning on and off the third switching device;
a second bootstrap capacitor circuit electrically connected to the third drive circuit, the second bootstrap capacitor circuit including a second bootstrap capacitor;
a fourth drive circuit for turning on and off the fourth switching device;
an inductor electrically connected in series between the first node and the second node; and
a control circuit electrically connected with the first drive circuit, the second drive circuit, the third drive circuit, and the fourth drive circuit,
wherein, in a case that the output voltage is higher than the input voltage, the control circuit controls the first drive circuit, the second drive circuit, the third drive circuit and the fourth drive circuit so as to:
alternately turn on and off the third switching device and the fourth switching device periodically at a first on-off period such that the third switching device and the fourth switching device are turned on and off to continuously turn on the third switching device for a plurality of first on-durations;
continuously turn on the first switching device and continuously turn off the second switching device so as not to charge the first bootstrap capacitor for a certain first on-duration out of the plurality of first on-durations;
charge the first bootstrap capacitor by continuously turning on the second switching device while continuously turning off the first switching device for a sustaining duration in a further first on-duration out of the plurality of first on-durations; and
cause the further first on-duration to be longer than the certain first on-duration by a length of the sustaining duration, and
wherein, in a case that the output voltage is lower than the input voltage, the control circuit controls the first drive circuit, the second drive circuit, the third drive circuit and the fourth drive circuit so as to:
alternately turn on and off the first switching device and the second switching device periodically at a second on-off period such that the first switching device and the second switching device are turned on and off to continuously turn on the first switching device for a plurality of second on-durations;
continuously turn on the third switching device and turning off the fourth switching device so as not to charge the second bootstrap capacitor for a certain second on-duration out of the plurality of second on-durations;
charge the second bootstrap capacitor by continuously turning off the third switching device and continuously turning on the fourth switching device for a charging duration in a further second on-duration out of the plurality of second on-durations; and
cause the further second on-duration to be longer than the certain second on-duration by a length of the charging duration.

16. The DC-DC converter according to claim 15, wherein the first on-off period is equal in length to the second on-off period.

* * * * *